United States Patent
Matsuoka

(10) Patent No.: US 7,446,899 B2
(45) Date of Patent: Nov. 4, 2008

(54) IMAGE PROCESSING METHOD, IMAGE PROCESSING APPARATUS, AND STORAGE MEDIUM

(75) Inventor: Hirochika Matsuoka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 09/902,760

(22) Filed: Jul. 12, 2001

(65) Prior Publication Data
US 2002/0054307 A1 May 9, 2002

(30) Foreign Application Priority Data
Jul. 14, 2000 (JP) ............................. 2000-214193

(51) Int. Cl.
*G06K 9/00* (2006.01)
*G03F 3/08* (2006.01)

(52) U.S. Cl. .................. 358/1.9; 358/518; 382/167

(58) Field of Classification Search .............. 358/1.9, 358/448, 504, 505, 515, 518; 382/162, 167; 345/590
See application file for complete search history.

(56) References Cited

U.S. PATENT DOCUMENTS

| | | | | |
|---|---|---|---|---|
| 4,831,243 A | | 5/1989 | Enari et al. ................. 235/436 |
| 5,185,661 A | * | 2/1993 | Ng ............................. 358/505 |
| 5,208,911 A | * | 5/1993 | Newman et al. ............ 345/600 |
| 5,627,940 A | | 5/1997 | Rohra et al. ................. 395/12 |
| 5,801,854 A | * | 9/1998 | Naylor, Jr. .................. 358/518 |
| 5,903,275 A | * | 5/1999 | Guay .......................... 345/590 |
| 5,982,990 A | * | 11/1999 | Gondek ...................... 358/1.9 |
| 6,058,207 A | * | 5/2000 | Tuijn et al. .................. 382/162 |
| 6,204,939 B1 | * | 3/2001 | Lin et al. .................... 358/1.9 |
| 6,388,674 B1 | * | 5/2002 | Ito et al. ..................... 345/590 |
| 6,437,792 B1 | * | 8/2002 | Ito et al. ..................... 345/600 |
| 6,882,445 B1 | * | 4/2005 | Takahashi et al. ........... 358/1.9 |

OTHER PUBLICATIONS

"Principles of Color Technology", by Roy S. Berns, third edition, pp. 20-23 and pp. 151-164, copyright 2000, John Wiley & Sons, Inc., A Wiley-Interscience Publication.*

* cited by examiner

*Primary Examiner*—Edward L Coles
*Assistant Examiner*—James A Thompson
(74) *Attorney, Agent, or Firm*—Fitzpatrick, Cella, Harper & Scinto

(57) ABSTRACT

Mapping conversion to absorb differences of shapes of color reproduction gamuts and also preserve gradation is provided. In this image processing method, a color signal located within a first color reproduction gamut represented by a first color system is subjected to mapping conversion into a color signal located within a second color reproduction gamut represented by the first color system, where a locus of a change of color in the first color reproduction gamut is represented by a curve, mapping is performed to the curve, and the mapping conversion is performed on the basis of relation of the curves before and after the mapping.

9 Claims, 23 Drawing Sheets

DISCRETE VALUES CAPABLE OF BEING TAKEN= {0, $d_1$, $d_2$, $d_3$, $d_4$, 255}

IMAGE PROCESSING METHOD, IMAGE PROCESSING APPARATUS, AND STORAGE MEDIUM

BACKGROUND OF THE INVENTION

1. Field of the Invention

The present invention relates to a technical field in which a color signal located within a first color reproduction gamut (or range) represented by a first color system is subjected to mapping conversion into a color signal located within a second color reproduction gamut represented by the first color system.

2. Related Background Art

In recent years, as personal computers and work stations have spread, DTP (desktop publishing) and CAD (computer-aided design) have come to be widely used. Thus, color reproduction techniques by which a color represented on a monitor by the computer is accurately reproduced by using a coloring agent becomes important. For example, in DTP, a computer system which includes at least a color monitor and a color printer creates, edits and processes a color image on the color monitor, and then outputs the obtained color image by means of the color printer. Here, a user strongly wishes that the color image on the monitor and the printer output image have the same appearance.

However, in the color reproduction technique, achieving this goal is difficult, because of the following reasons.

The color monitor represents the color image by generating light of a specific frequency using a fluorescent body. On the other hand, ink or the like in a print made by a color printer absorbs light of a specific frequency, and the appearance of the color image is based on the remaining (unabsorbed) reflection light. Thus, since an image display form of the color monitor is different from an image display form of the color printer, the color reproduction gamut of the color monitor is very different from the color reproduction gamut of the color printer. Further, even among color monitors, the color reproduction gamut is different as between liquid crystal monitors, CRTs (cathode-ray tube) of electron-gun type, and plasma monitors. Also, even among color printers, the color reproduction gamut is different in accordance with recording sheet quality, difference of ink usage quantity, and the like. For this reason, it is impossible to achieve a complete match of the color of the image on the color monitor with the color of the image output from the color printer calorimetrically. It is also impossible to achieve a complete match of the colors of the images on the plural kinds of sheets output from the plural kinds of color printers calorimetrically. Therefore, when seeing the displayed color image on each output medium, a person observes a serious distinction among the output images.

Here, as a technique to absorb perceivable distinction on the displayed color image and perceivably match the displayed images among the display media of which the reproduction gamuts are different from others, there is known a gamut mapping technique, in which one color reproduction gamut is mapped into another color reproduction gamut by using a uniform color system. As one example of the gamut mapping technique, there is a technique in which, in the uniform color system, linear mapping is performed in a lightness-chroma dimension for each hue. According to this technique, a monitor color reproduction gamut as schematically shown in FIG. 27 is mapped into a printer color reproduction gamut as schematically indicated by the dotted line in FIG. 28.

However, an image corrected by such linear mapping and then output might be undesirable in appearance. This is because the difference between the shape of the monitor color reproduction gamut and the shape of the printer color reproduction gamut causes unnaturalness.

Here, the difference between the shape of the monitor color reproduction gamut and the shape of the printer color reproduction gamut will be simply explained. For example, FIG. 29 schematically shows the monitor and printer color reproduction gamuts in a green hue, the printer color reproduction gamut being indicated by the solid line, while the monitor color reproduction gamut is indicated by the dotted line. As is apparent from FIG. 29, in the green hue, the monitor color reproduction gamut is not similar to the printer color reproduction gamut, and thus the shape of the monitor color reproduction gamut is quite different from the shape of the printer color reproduction gamut. FIG. 30 schematically shows the monitor and printer color reproduction gamuts in a red hue, the monitor color reproduction gamut being indicated by the solid line, while the printer color reproduction gamut is indicated by the dotted line. As is apparent from FIG. 30, in the red hue, the shape of the monitor color reproduction gamut is relatively similar to the shape of the printer color reproduction gamut.

In order to solve the above problem, nonlinear gamut mapping to preserve chroma in the low-chroma part and lightness in the intermediate-lightness part and also absorb the difference between the shape of the monitor color reproduction gamut and the shape of the printer color reproduction gamut is effective.

As such a nonlinear gamut mapping, a method of superposing one- to three-dimensional mapping has been proposed.

However, in this nonlinear gamut mapping, there is room for improvement in the point of gradation. That is, in superposing the one- to three-dimensional mapping according to the conventional gamut mapping method, each mapping is different from the others because of chromaticity, hue and the like of the mapping-target color. Thus, even if there is no problem in the individual mapping, a problem may still occur in the gradation as a result of superposing the mappings.

Here, it should be noted that the term "gradation" is used for the meaning of a proper change rate in a case where color changes according to a certain rule. Further, an operation designed to preserve gradation corresponds to an operation designed to preserve the change rate. Next, FIGS. 31A and 31B will be briefly explained. In a case where a proper change rate has varied greatly, as shown by the part enclosed with the circle in FIG. 31A, in general, such variation frequently causes a pseudo-contour and the like, although this phenomenon is dependent on conditions such as hue, chroma and the like. On the other hand, in a case where a proper change rate can be kept, as shown in FIG. 31B, a perceivable problem does not occur easily.

SUMMARY OF THE INVENTION

An object of the present invention is to absorb a difference in shape as between color reproduction gamuts, provide mapping conversion that will preserve gradation, suppress pseudo-contours in an output image, and obtain a high-quality output image.

In order to achieve the above object, the present invention provides an image processing method by which a color signal located within a first color reproduction gamut represented by a first color system is subjected to mapping conversion into a color signal located within a second color reproduction gamut represented by the first color system. More specifically, a locus of a change of color in the first color reproduction gamut is represented by a curve, the curve is mapped, and the mapping conversion of a value in the first gamut is performed on the basis of the relation between the curves before and after the mapping.

Other objects and features of the present invention will be apparent from the following description taken in conjunction with the accompanying drawings.

DETAILED DESCRIPTION OF THE PREFERRED EMBODIMENTS

First Embodiment

Figure 1:
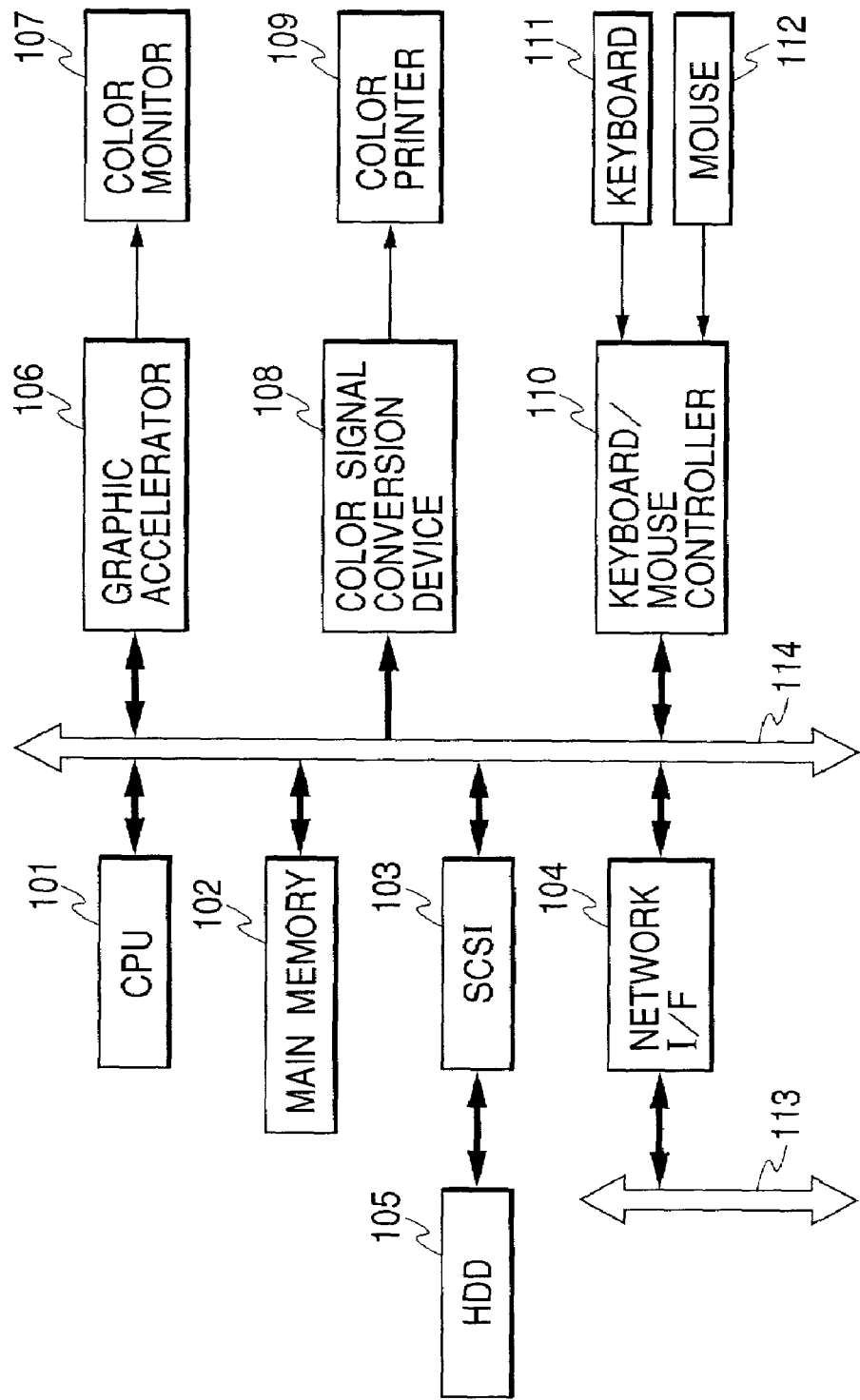
FIG. 1 is a block diagram showing a system structure of a color signal conversion device according to the first embodiment of the present invention.

FIG. 1 is a block diagram showing a system structure of a color signal conversion device according to the first embodiment.

In FIG. 1, numeral 101 denotes a CPU (central processing unit), numeral 102 denotes a main memory, numeral 103 denotes a SCSI (small computer system interface), numeral 104 denotes a network I/F (interface), numeral 105 denotes an HDD (hard disk drive), numeral 106 denotes a graphic accelerator, numeral 107 denotes a color monitor, numeral 108 denotes a color signal conversion device, numeral 109 denotes a color printer, numeral 110 denotes a keyboard/mouse controller, numeral 111 denotes a keyboard, numeral 112 denotes a mouse, numeral 113 denotes a LAN (local area network), and numeral 114 denotes a PCI (peripheral component interface) bus.

Image data stored in the HDD 105 is transferred to the main memory 102 through the SCSI 103 and the PCI bus 114, in response to an instruction from the CPU 101. Further, image data stored in a server connected to the LAN 113 or image data on the Internet is transferred to the main memory 102 through the network I/F 104 and the PCI bus 114, in response to an instruction from the CPU 101.

The image data stored in the main memory 102 is transferred to the graphic accelerator 106 through the PCI bus 114 in response to an instruction from the CPU 101. The transferred image data is D/A (digital-to-analog) converted by the graphic accelerator 106, the obtained analog data is then transmitted to the color monitor 107 through a display cable, and the image data is displayed on the color monitor 107. Here, if a user instructs to output the image data stored in the main memory 102 through the color printer 109, the CPU 101 first transfers color reproduction gamut information of the proper color monitor and color reproduction gamut information of the proper color printer from the HDD 105 to the main memory 102, and the CPU 101 further transfers these two kinds of color reproduction gamut information to the color signal conversion device 108. Besides, the CPU 101 instructs the color signal conversion device 108 to perform initialization for data conversion from R (red), G (green) and B (blue) image data into C (cyan), M (magenta), Y (yellow) and K (black) image data. The initialization will be later described in detail. After the initialization ended, the R, G and B image data stored in the main memory 102 are transferred to the color signal conversion device 108 through the PCI bus 114 in response to an instruction from the CPU 101. The color signal conversion device 108 performs color signal conversion to the R, G and B image data on the basis of a result of gamut mapping, and then transmits the C, M, Y and K image data being the converted results to the color printer 109. As a result of such a series of operations, the C, M, Y and K image data are output from the color printer 109.

Figure 2:
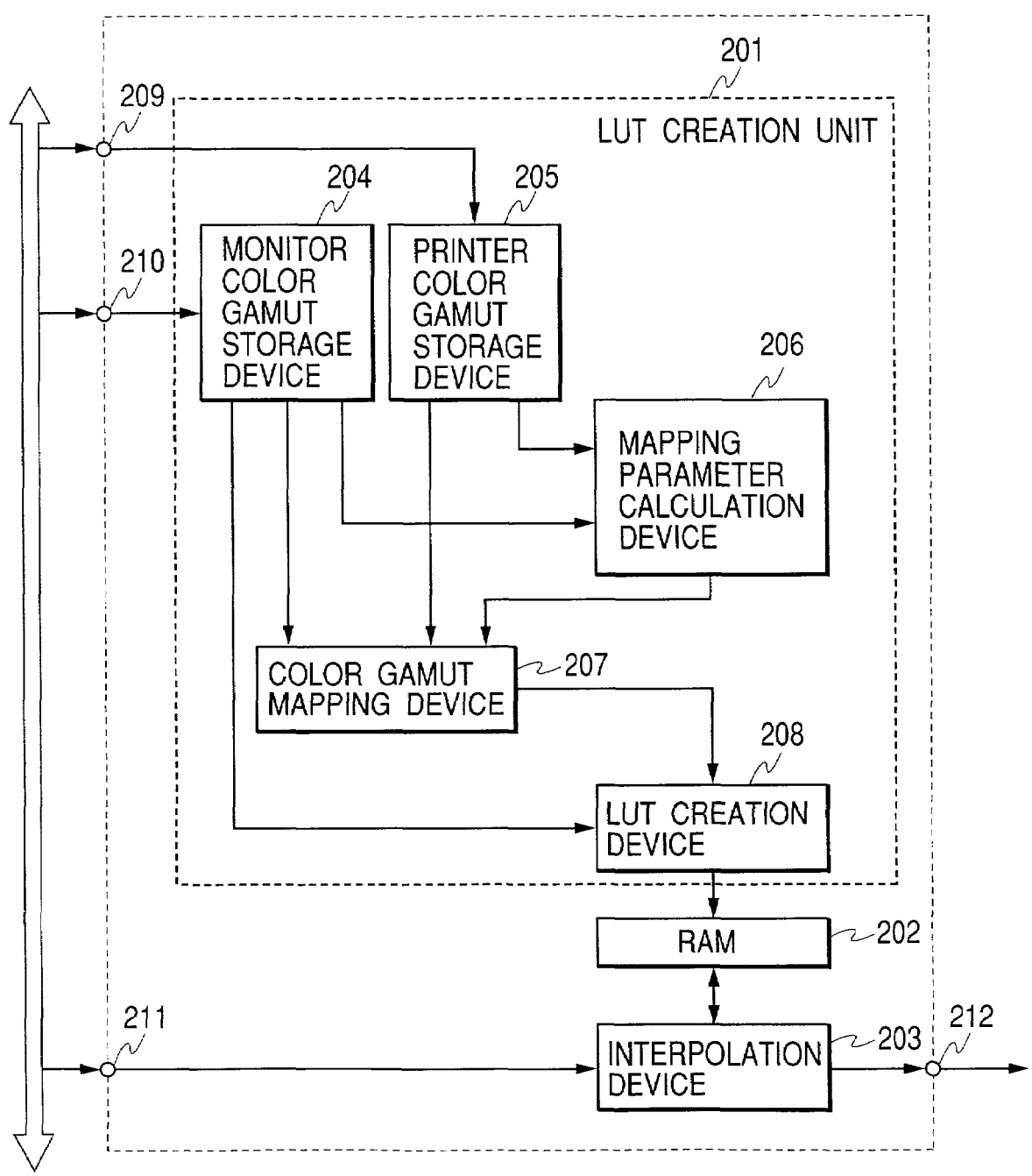
FIG. 2 is a block diagram showing a structure of the color signal conversion device according to the first embodiment.

FIG. 2 is a block diagram showing a structure of the color signal conversion device 108.

In FIG. 2, numeral 201 denotes an LUT (look-up table) creation unit in which respective devices operate according to designated procedures to create an LUT for converting the R, G and B image data into C, M, Y and K image data. Numeral 202 denotes a RAM (random-access memory) in which the LUT created by the LUT creation unit 201 is stored. Numeral 203 denotes an interpolation device in which the C, M, Y and K image data to be output with respect to the input R, G and B image data are calculated through an interpolation operation using the LUT stored in the RAM 202. Numeral 211 denotes a terminal through which the R, G and B image data stored in the main memory are input in an RGB data format according to a raster scan method, and numeral 212 denotes a terminal through which the C, M, Y and K image data corresponding to the input R, G and B image data are output to the color printer.

Next, the internal structure of the LUT creation unit 201 will be explained. Numeral 209 denotes a terminal through which information representing the printer color reproduction gamut is input, and numeral 210 denotes a terminal through which information representing the monitor color reproduction gamut is input. Numeral 204 denotes a monitor color gamut storage device which stores the input monitor color reproduction gamut information, and numeral 205 denotes a printer color gamut storage device which stores the input printer color reproduction gamut information. Numeral 206 denotes a mapping parameter calculation device which calculates compression parameters necessary in a later-described color gamut mapping device 207, by referring to the printer color reproduction gamut information and the monitor color reproduction gamut information. Numeral 207 denotes the color gamut mapping device which maps the monitor color reproduction gamut into the printer color reproduction gamut by referring to the monitor color reproduction gamut information and the printer color reproduction gamut information. Hereinafter, the result of the mapping is called a "mapping color reproduction gamut". Numeral 208 denotes an LUT creation device which creates the LUT for converting the R, G and B image data into the C, M, Y and K image data, by referring to the relation between the monitor color reproduction gamut and the mapping color reproduction gamut, the R, G and B image data for outputting a predetermined color on the monitor, and the C, M, Y and K image data for outputting a predetermined color on the printer.

Next, the operation of the LUT creation unit 201 will be explained. It should be noted that, although an L*a*b* color space is used as a uniform color system in the mapping operation of the LUT creation unit 201 according to the present embodiment, another kind of uniform color system may be used.

First, the color reproduction gamut information of the color monitor and the color reproduction gamut information of the color printer are transmitted in response to an instruction from the CPU 101. The transmitted color reproduction gamut information of the color monitor is stored as the monitor color reproduction gamut information in the monitor color gamut storage device 204 in the LUT creation unit 201, and the transmitted color reproduction gamut information of the color printer is stored as the printer color reproduction gamut information in the printer color gamut storage device 205 in the LUT creation unit 201. After the transmission of the information ended, it is instructed by the CPU 101 to perform initialization for color signal conversion. If such an instruction is received by the color signal conversion device 108, the internal structure of the LUT creation unit 201 operates as follows. First, the mapping parameter calculation device 206 operates to calculate the various parameters necessary for the color gamut mapping device 207.

After the calculation of the parameters ended, the color gamut mapping device 207 operates to map the monitor color reproduction gamut into the printer color reproduction gamut in the uniform color system. It should be noted that, in the present embodiment, the color gamut mapping device 207 performs the mapping operation according to a flow chart shown in FIG. 3, and this mapping operation will be described below.

Next, the LUT creation device 208 creates the LUT for converting the R, G and B image data into the C, M, Y and K image data by referring to the mapping color reproduction gamut that is the final mapping result, and then writes the created LUT in the RAM 202. After this series of operations has ended, the LUT creation device 208 notifies the CPU 101 of the fact that the initialization is complete.

Figure 3:
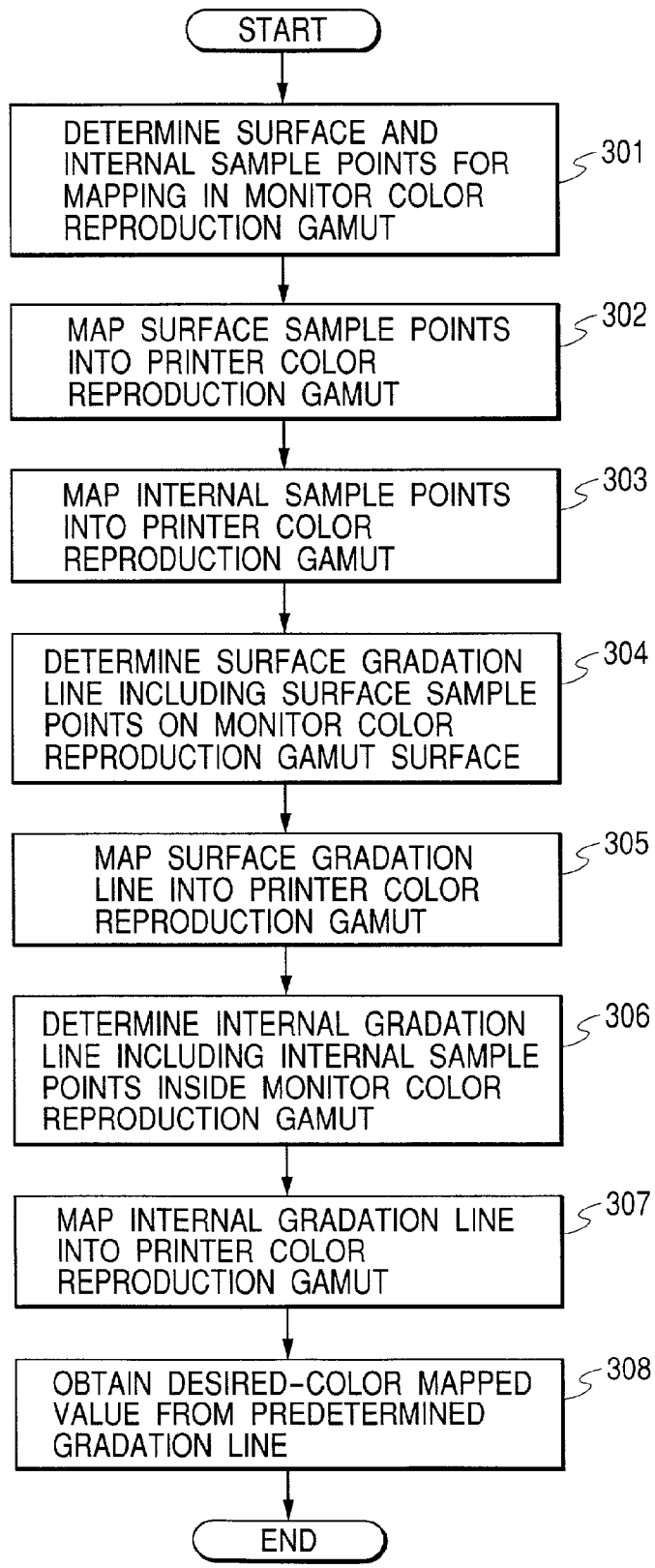
FIG. 3 is a flow chart showing a mapping operation of a color gamut mapping device 207 in the first embodiment.

In the following, the operation of the color gamut mapping device 207 will be explained with reference to the flow chart shown in FIG. 3. It should be noted that, in the explanation of the flow chart in FIG. 3, a consecutive locus by which a certain color and another certain color are connected is called a "gradation line".

In step 301, sample points to define the mapping of the color gamut are determined. The determined sample points include surface sample points, to define the mapping on the surface of the monitor color reproduction gamut, and internal sample points, to define the mapping in the monitor color reproduction gamut.

In step 302, with respect to the surface sample points, it is determined where the mapping should be performed within the printer color reproduction gamut. Here, it should be noted that the mapping result of the surface sample points is not necessarily located on the surface of the printer color reproduction gamut. In step 303, with respect to the internal sample points, it is determined where the mapping should be performed within the printer color reproduction gamut. In this process, it should be noted that the mapping is controlled such that the mapping result of the internal sample points is sure to be located inside the printer color reproduction gamut.

In step 304, a gradation line (called a "surface gradation line" hereinafter) connecting the two different predetermined surface sample points is defined. Then, in step 305, with respect to this surface gradation line, it is determined where the mapping should be performed within the printer color reproduction gamut. It should be noted that this mapping is controlled such that the mapping result of the surface gradation line is sure to be a consecutive locus. Further, it should be noted that the mapping result of the surface gradation line is not necessarily located on the surface of the printer color reproduction gamut.

In step 306, a gradation line (called an "internal gradation line" hereinafter) connecting the two predetermined different internal sample points is defined. Then, in step 307, with respect to the internal gradation line, it is determined where the mapping should be performed within the printer color reproduction gamut. Here, it should be noted that the mapping is controlled such that the mapping result of the internal gradation line is sure to be a consecutive locus and to be located inside the printer color reproduction gamut.

Finally, in step 308, with respect to the color desired to represent the mapping color reproduction gamut, the mapping result of the monitor color reproduction gamut into the mapping color reproduction gamut is calculated on the basis of the surface and internal gradation lines.

In the present embodiment, the following two methods are adopted to obtain the mapping result. One is the method of first calculating the internal division ratio of the gradation line for the desired color before the mapping, and then obtaining the mapping result from the gradation line after the mapping in accordance with the calculated internal division ratio. The other is the method of first calculating an angle ratio on the gradation line for the desired color before the mapping, and then obtaining the mapping result from the gradation line after the mapping in accordance with the calculated angle ratio.

In order to represent the surface gradation line and the internal gradation line, various spline curves, such as a B-spline curve, a one- or more-dimensional spline curve, etc., a Bézier curve, and the like can be used.

According to the present embodiment, a proper change rate in a case where color varies according to a certain rule in the pre-mapping color reproduction gamut can be preserved, and in this way the gradation can be maintained well. Further, according to the present embodiment, since various spline curves can be used to represent the surface gradation line and the internal gradation line, free and easy control can be achieved. Further, since various spline techniques and curve fitting techniques in 3D-CAD (three-dimensional computer-aided design) and the like can be applied, extendibility is abundant.

Further, according to the present embodiment, in addition to the mapping from the monitor color reproduction gamut into the printer color reproduction gamut, various applications such as mapping from a printer color reproduction gamut into another and different printer color reproduction gamut, mapping from a monitor color reproduction gamut into another and different monitor color reproduction gamut, and the like can be performed.

In the present embodiment, the restraint condition that the change rate is to be preserved, results in the technique of the mapping by "curve". That is, the locus of the change of the color in the color reproduction gamut being the mapping origin is represented by using the curve, and the mapping is performed such that the change rate of this curve is maintained, whereby the change rate is preserved.

According to the present invention, the proper change rate can be preserved in the case where the color varies according to a certain rule in the color reproduction gamut before the mapping, and thus the gradation can be well maintained, and gamut mapping to absorb the difference in shapes as between the monitor color reproduction gamut and the printer color reproduction gamut can be performed. Therefore, in outputting an image corrected by such gamut mapping, the problem of poor image quality due to a pseudo-contour or the like can be greatly decreased, and also it becomes possible to obtain images in which the appearances of colors are properly matched.

Second Embodiment

In the first embodiment, color gamut mapping with a very high degree of freedom is possible. On the other hand, since the control items tend to be multiple and complex, the load for color design becomes heavy. For example, since there are huge degrees of freedom even in just setting the surface sample points and the internal sample points, to adjust them requires labor. Thus, in the second embodiment, a method of reducing the labor in the color design by adding limitations to the surface sample points and the internal sample points is proposed.

It should be noted that the second embodiment is obtained by modifying the operation algorithm of the color gamut mapping device 207 in the first embodiment. For this reason, the operation explanation overlapping with the operation explanation in the first embodiment is omitted, and only the operation algorithm of the color gamut mapping device 207 will be explained.

The operation of the color gamut mapping device 207 will be explained with reference to the flow chart shown in FIG. 3. Hereinafter, each step of the flow chart will be described in detail.

Determining the sample points in the step 301 will be described in detail.

In determining the surface sample points and the internal sample points, later-described restraint conditions are defined, and sample points distributed on six faces, namely a red face, a green face, a blue face, a cyan face, a magenta face and a yellow face, are considered. Of course, to control the mapping, there is no problem even if a sample point which does not satisfy the later-described restraint conditions and is not distributed on the above six faces is used.

The restraint condition on the sample points distributed on the six faces is not defined in an L*a*b* color space but in an RGB color space. The conversion relation between the RGB color space and the L*a*b* color space has been stored in the monitor color gamut storage device 204 storing the monitor color reproduction gamut, and the color gamut mapping device 207 can always use the stored conversion relation. It should be noted that the color reproduction gamut in the RGB color space is defined by $0 \leq R \leq 255$, $0 \leq G \leq 255$, and $0 \leq B \leq 255$.

First, the condition for the surface sample point will be described. That is, the condition for the sample point is to satisfy any of the following 12 conditions:

$G=B=0, 0 \leq R \leq 255$      condition A1)

$0 \leq G=B \leq 255, R=255$      condition A2)

If either one of these two conditions is satisfied, the sample point is located on the red face and on the surface of the monitor color reproduction gamut.

$R=B=0, 0 \leq G \leq 255$      condition A3)

$0 \leq R=B \leq 255, G=255$      condition A4)

If either one of these two conditions is satisfied, the sample point is located on the green face and on the surface of the monitor color reproduction gamut.

$R=G=0, 0 \leq B \leq 255$      condition A5)

$0 \leq R=G \leq 255, B=255$      condition A6)

If either one of these two conditions is satisfied, the sample point is located on the blue face and on the surface of the monitor color reproduction gamut.

$R=0, 0 \leq G=B \leq 255$      condition A7)

$0 \leq R \leq 255, G=B=255$      condition A8)

If either one of these two conditions is satisfied, the sample point is located on the cyan face and on the surface of the monitor color reproduction gamut.

$$G=0, 0 \leq R=B \leq 255 \quad \text{condition A9)}$$

$$0 \leq G \leq 255, R=B=255 \quad \text{condition A10)}$$

If either one of these two conditions is satisfied, the sample point is located on the magenta face and on the surface of the monitor color reproduction gamut.

$$B=0, 0 \leq R=G \leq 255 \quad \text{condition A11)}$$

$$0 \leq B \leq 255, R=G=255 \quad \text{condition A12)}$$

If either one of these two conditions is satisfied, the sample point is located on the yellow face and on the surface of the color reproduction gamut.

Next, the condition for the internal sample point will be described. That is, the condition for the internal sample point is to satisfy any of the following six conditions:

$$G=B \leq R, 0 \leq R<255 \quad \text{condition B1)}$$

If this condition is satisfied, the sample point is located on the red face and inside the monitor color reproduction gamut.

$$R=B \leq G, 0<G<255 \quad \text{condition B2)}$$

If this condition is satisfied, the sample point is located on the green face and inside the monitor color reproduction gamut.

$$R=G \leq B, 0<B<255 \quad \text{condition B3)}$$

If this condition is satisfied, the sample point is located on the blue face and inside the monitor color reproduction gamut.

$$R \leq G=B, 0<G=B<255 \quad \text{condition B4)}$$

If this condition is satisfied, the sample point is located on the cyan face and inside the monitor color reproduction gamut.

$$G \leq R=B, 0<R=B<255 \quad \text{condition B5)}$$

If this condition is satisfied, the sample point is located on the magenta face and inside the monitor color reproduction gamut.

$$B \leq R=G, 0<R=G<255 \quad \text{condition B6)}$$

If this condition is satisfied, the sample point is located on the yellow face and inside the monitor color reproduction gamut.

Further, in the mapping calculation of the surface sample points in the step 302, a further restraint condition is added. That is, with respect to a surface sample point which satisfies any one of conditions A1, A3, A5, A7, A9 and A11, the mapping is surely performed on the surface of the printer color reproduction gamut. However, with respect to a surface sample point which satisfies any one of conditions A2, A4, A6, A8, A10 and A12, the mapping might be performed inside the printer color reproduction gamut.

Figure 4:
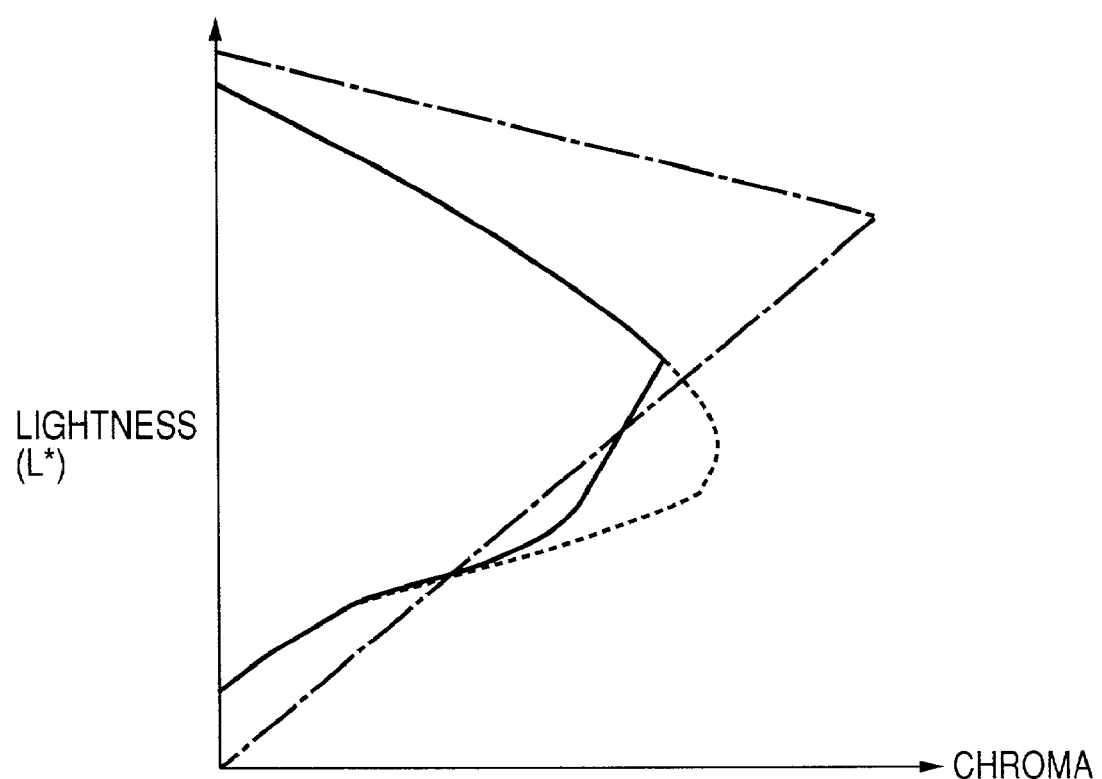
FIG. 4 is a schematic diagram showing loci of a surface sample point before and after the mapping on a green face.

Here, loci of the surface sample point before and after the mapping on the green face are schematically shown in FIG. 4 as an example of the mapping in step 302. In FIG. 4, the alternate short and long dashed line represents the locus of the surface sample point obtained in a case of satisfying either condition A3 or condition A4, and the solid line represents the locus obtained in a case of mapping the surface sample point. The dotted line represents an example of the locus obtained in the case where all the surface sample points are mapped into the surface of the printer color reproduction gamut.

In the following explanation, a chroma-lightness locus (i.e., the locus represented by the alternate short and long dashed line in FIG. 4) of the surface sample point in a case of satisfying either condition A3 or condition A4 is called a monitor green line. Further, a chroma-lightness locus (i.e., the locus represented by the solid line in FIG. 4) obtained by mapping the surface sample point is called a "mapped green line".

Further, according to the above expression manner, a chroma-lightness locus of the surface sample point in a case of satisfying either condition A1 or A2 is called a "monitor red line", a chroma-lightness locus of the surface sample point in a case of satisfying either condition A5 or A6 is called a "monitor blue line", a chroma-lightness locus of the surface sample point in a case of satisfying either condition A7 or A8 is called a "monitor cyan line", a chroma-lightness locus of the surface sample point in a case of satisfying either condition A9 or A10 is called a "monitor magenta line", and a chroma-lightness locus of the surface sample point in a case of satisfying either condition A11 or A12 is called a "monitor yellow line". In a case of not especially sticking to a single hue, such locus is called simply a "monitor line". Further, corresponding chroma-lightness loci obtained by mapping the surface sample points are respectively called a "mapped red line", a "mapped blue line", a "mapped cyan line", a "mapped magenta line" and a "mapped yellow line". In a case of not especially sticking to a single hue, such locus is called simply a "mapped line".

Figure 5:
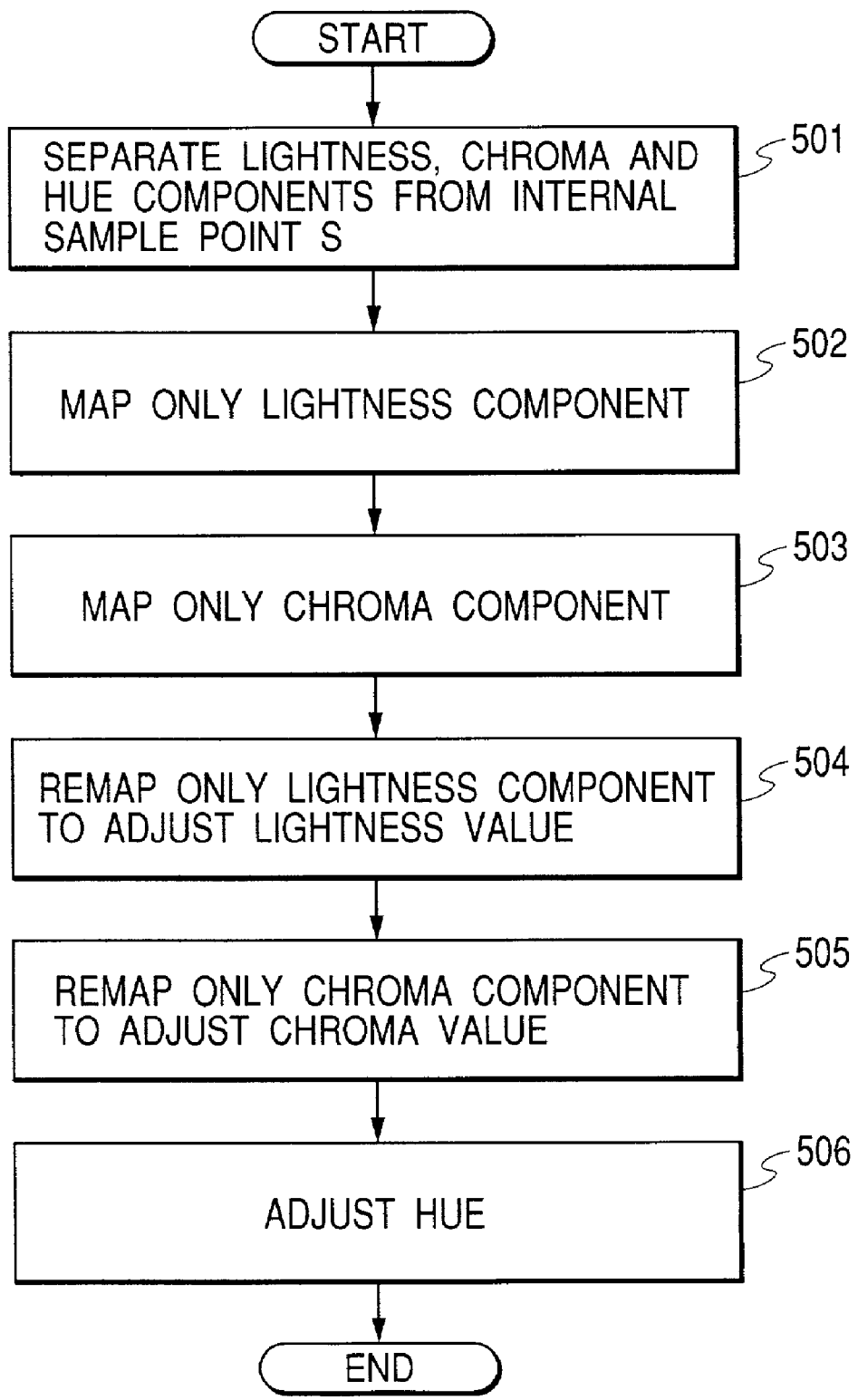
FIG. 5 is a flow chart showing a mapping operation in a step 303 of FIG. 3 in the second embodiment of the present invention.

Next, the processing in step 303 will be explained with reference to the flow chart of FIG. 5.

It should be noted that the present embodiment is directed to an algorithm premised on the mapping that was originally to be performed on a three-dimensional space, has been reduced to a mapping performed on a two-dimensional space.

In step 501, a lightness component $L_S$, a chroma component $C_S$ and a hue component $H_S$ are separated from an internal sample point S. In step 502, the mapping is performed only for the separated light component $L_S$, and in step 503, the mapping is performed only for the separated chroma component $C_S$.

In the above steps, a boundary of the area to which the internal sample point can be mapped for the red face is called a "first intermediate mapped red line", such a boundary for the green face is called a "first intermediate mapped green line", such a boundary for the blue face is called a "first intermediate mapped blue line", such a boundary for the cyan face is called a "first intermediate mapped cyan line", such a boundary for the magenta face is called a "first intermediate mapped magenta line", and such a boundary for the yellow face is called a "first intermediate mapped yellow line". In a case of not especially sticking to a single hue, such boundary is called simply a "first intermediate mapped line".

Figure 10:
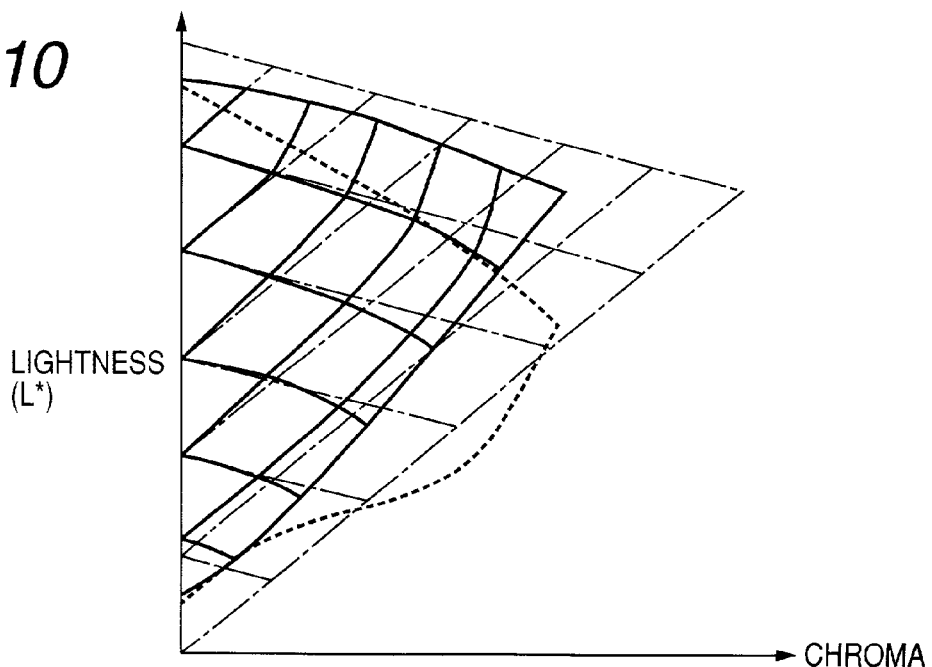
FIG. 10 is a schematic diagram showing a state of mapping on a green face.

As one example, FIG. 10 schematically shows a relation between the monitor green line (the locus represented by the alternate short and long dashed line) and the first intermediate mapped green line (the locus represented by the solid line) on the green face.

In step 504, in order to adjust the lightness, the mapping of the lightness is again performed while keeping the chroma constant.

In this step, a boundary of the area to which the internal sample point can be mapped for the red face is called a "second intermediate mapped red line", such a boundary for the green face is called a "second intermediate mapped green line", such a boundary for the blue face is called a "second intermediate mapped blue line", such a boundary for the cyan face is called a "second intermediate mapped cyan line", such a boundary for the magenta face is called a "second intermediate mapped magenta line", and such a boundary for the yellow face is called a "second intermediate mapped yellow line". In a case of not especially sticking to a single hue, such a boundary is called simply a "second intermediate mapped line".

In a case where the mapped line has been previously given, if the first intermediate mapped line is determined, the locus of the second intermediate mapped line is determined biuniquely based on the relation between the first intermediate mapped line and the mapped line. That is, when only the lightness component is mapped for the first intermediate mapped line, the second intermediate mapped line is given. When only the chroma component is mapped for the second intermediate mapped line, the mapped line is given. Therefore, if the chroma component of the first intermediate mapped line is combined with the lightness component of the mapped line, the second intermediate mapped line is given.

The present embodiment is explained on the premise that the mapped line has been previously given.

Figure 14:
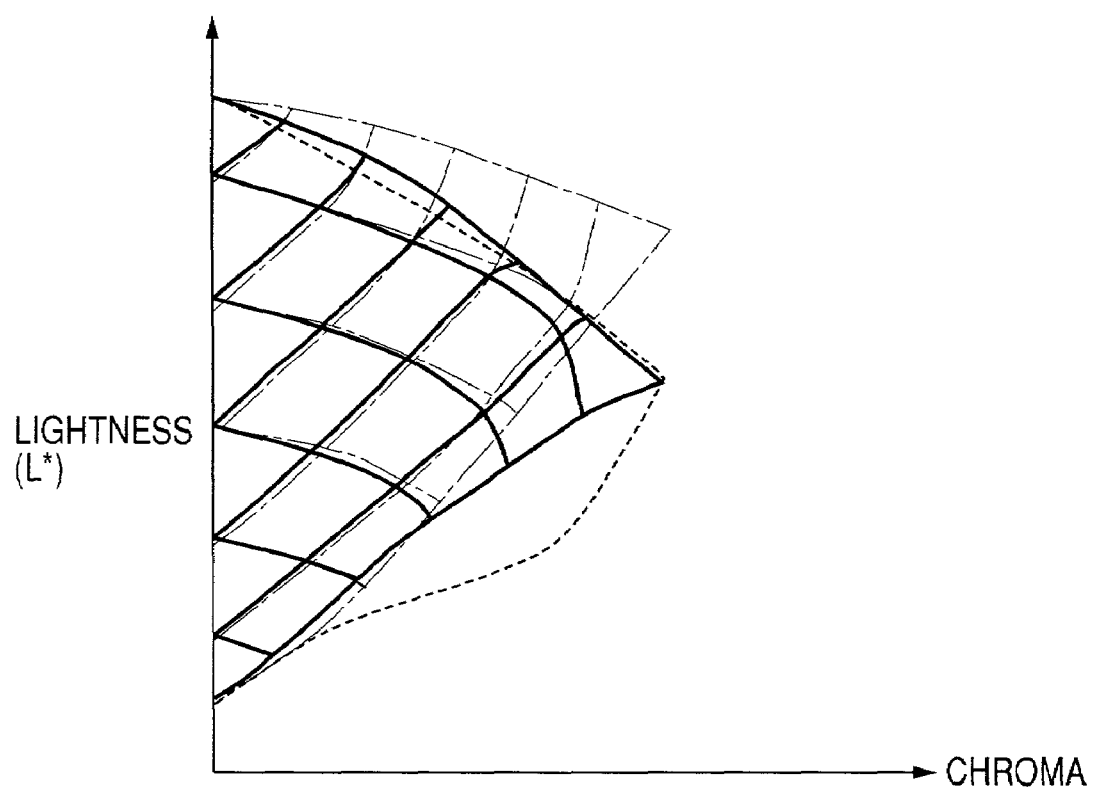
FIG. 14 is a schematic diagram showing a state of mapping until a lightness adjustment mapping operation in the step 504, on the green face.

Here, FIG. 14 schematically shows a relation between the first intermediate mapped green line and the second intermediate mapped green line on the green face.

Figure 18:
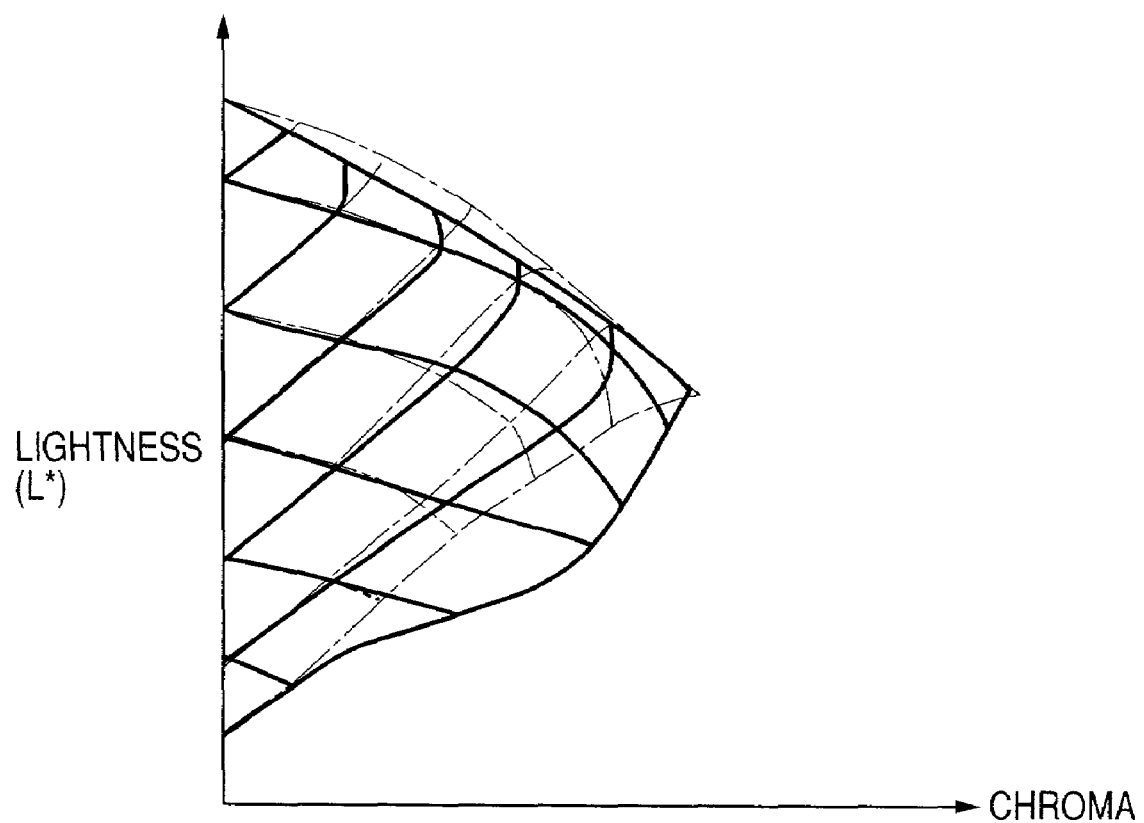
FIG. 18 is a schematic diagram showing a state of the mapping on the green face.

In step 505, in order to match the final mapping area with the mapped green line, the mapping of the chroma is performed while keeping the lightness constant. By this step, the mapping area of the internal sample points represented by the second intermediate mapped line is mapped into the mapping area represented by the mapped line. Here, FIG. 18 schematically shows a relation among the first intermediate mapped green line, the second intermediate mapped green line and the mapped green line on the green face.

In the following, the lightness mapping operation in the step 502 will be explained in detail.

Figure 9:
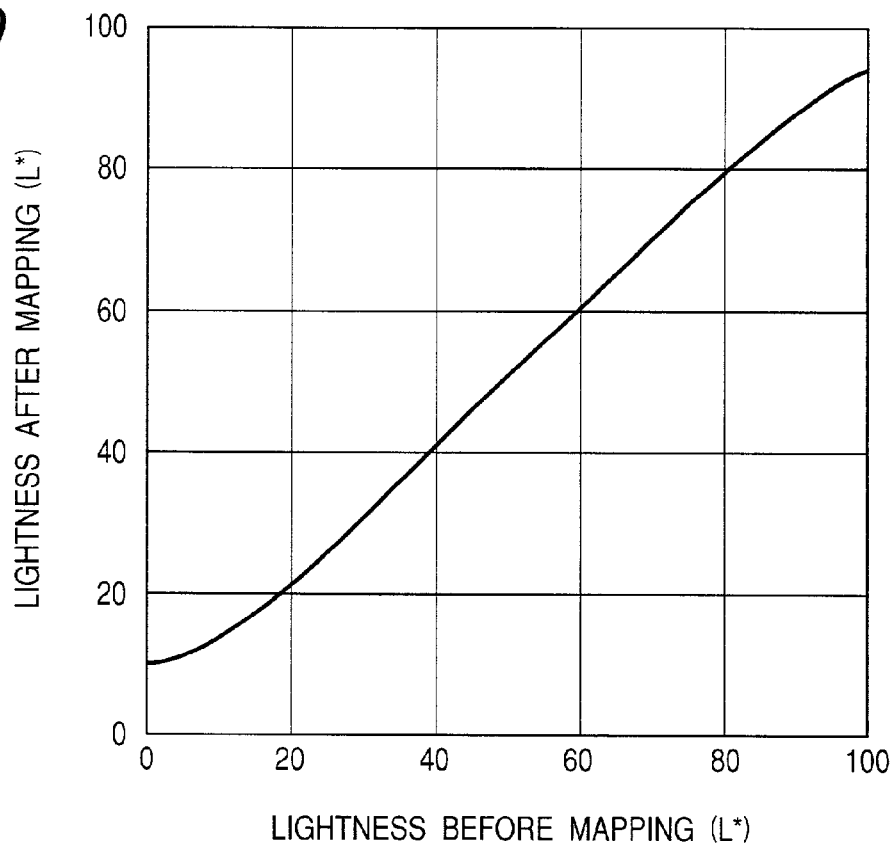
FIG. 9 is a diagram showing an example of a lightness input/output function for achieving nonlinear mapping of a lightness component.

An input/output function is controlled to preserve the lightness, for intermediate lightness. In vicinities of maximum lightness and minimum lightness, the input/output function is controlled to lower the differentiation value of the input/output function, i.e., to increase a compression ratio. Further, in order to prevent a pseudo-contour or the like appearing, the input/output function is controlled such that at least a first differentiation becomes continuous in all the points (i.e., C1 continuousness). FIG. 9 shows an example of the mapping of the lightness component according to the present embodiment. It should be noted that control parameters in this mapping have been previously set by the mapping parameter calculation device 206.

Figure 6:
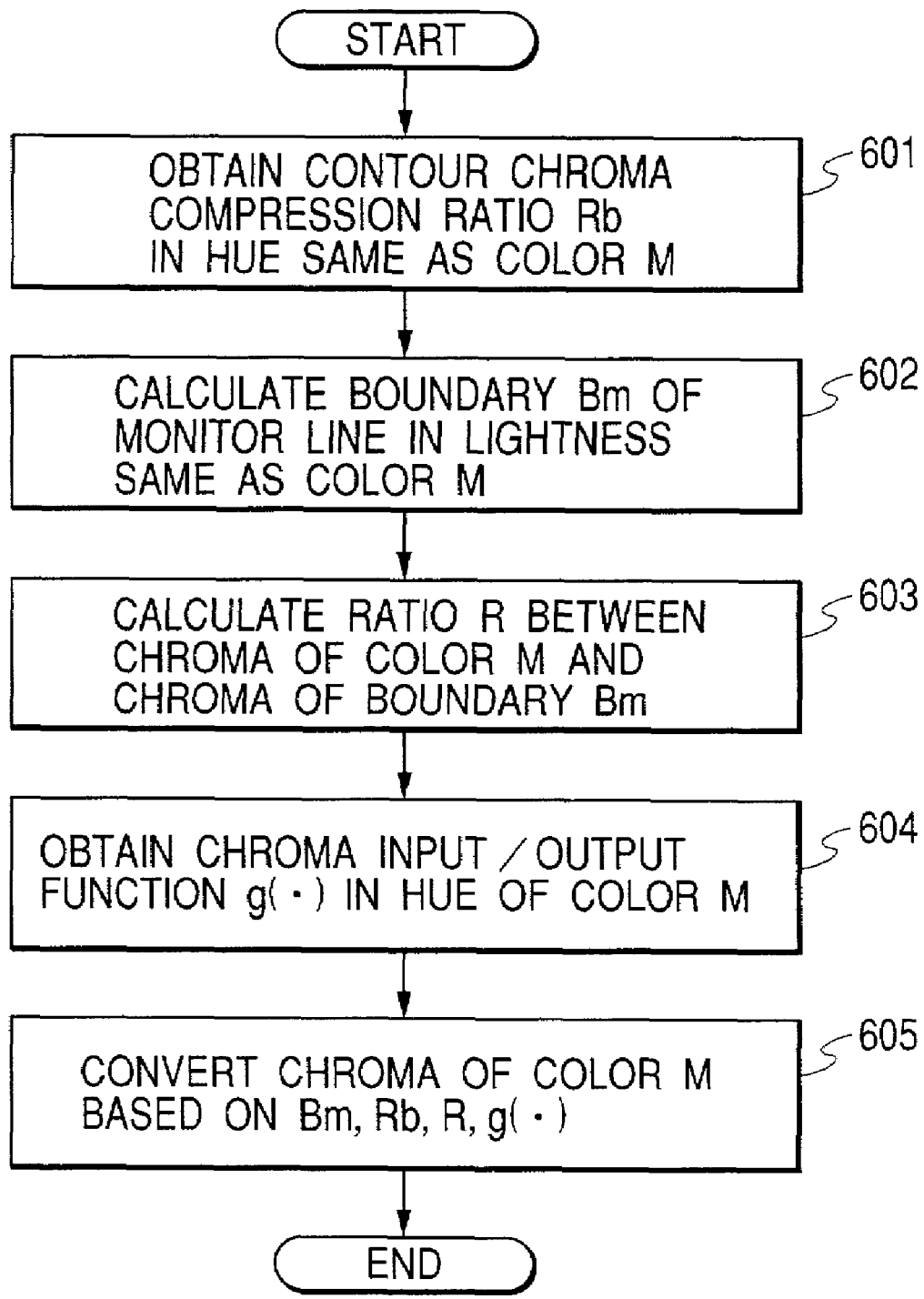
FIG. 6 is a flow chart showing a mapping operation in a step 502 of FIG. 5 in the second embodiment.

In the following, the chroma mapping operation in step 503 will be explained in detail with reference to the flow chart shown in FIG. 6.

In step 601, a contour chroma compression ratio Rb in hue of the color M being the mapping target is obtained by the mapping parameter calculation device 206. The hue of the color M belongs to any of the red face, the green face, the blue face, the cyan face, the magenta face and the yellow face, and the contour chroma compression ratio Rb is determined for each of these six faces.

Figure 7:
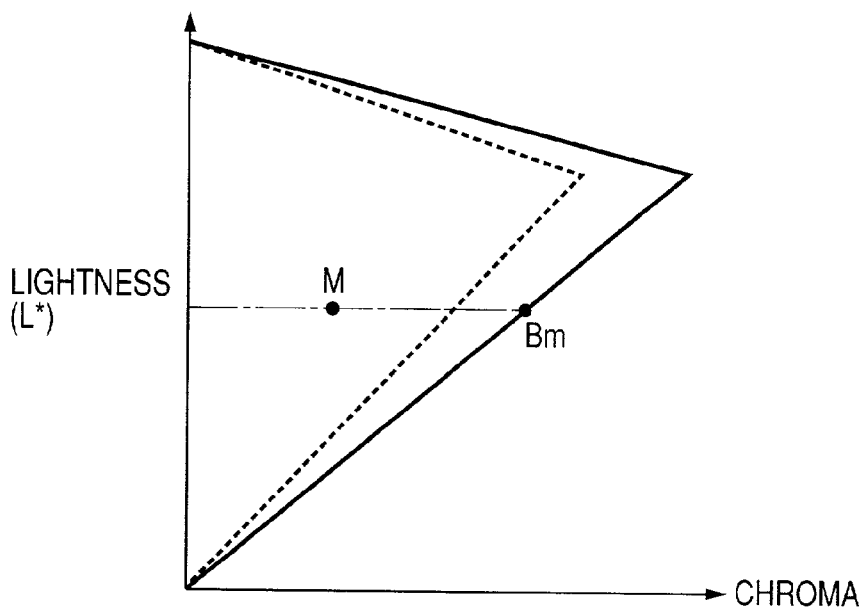
FIG. 7 is a schematic diagram showing spatial relation of color M and color Bm.

In step 602, a color Bm at the boundary of the monitor line in the lightness same as the color M is calculated. FIG. 7 schematically shows the relation between the color M and the color Bm. In FIG. 7, the solid line represents the monitor line, and the dotted line schematically represents how the contour of the monitor line is mapped in the chroma mapping operation of step 503.

In step 603, a ratio R is calculated from chroma Cm of the color M and chroma Cbm of the color Bm, as R=Cm/Cbm. Next, in step 604, a chroma input/output function g(•) for chroma mapping is obtained by the mapping parameter calculation device 206.

In step 605, the chroma mapping is performed by using a following expression, on the basis of the parameters calculated and obtained as above. It should be noted that symbol $Cm_{\_mapped}$ denotes the chroma after the mapping:

$$Cm_{\_mapped} = Cbm \times g(R)$$

Here, the chroma input/output function g(•) has following conditions. That is, the support of g(•) is [0,1], g(•) increases monotonously, g(0)=0, g(1)=Rb, g(•) is at least C1 continuousness, g'(0)=1, g'(1)=γ (γ>0, γ is a constant to control the compression, γ is determined for each hue, and γ varies in inverse proportion to Rb), and g'(x) ≠ 0 (0≦x≦1).

Figure 8:
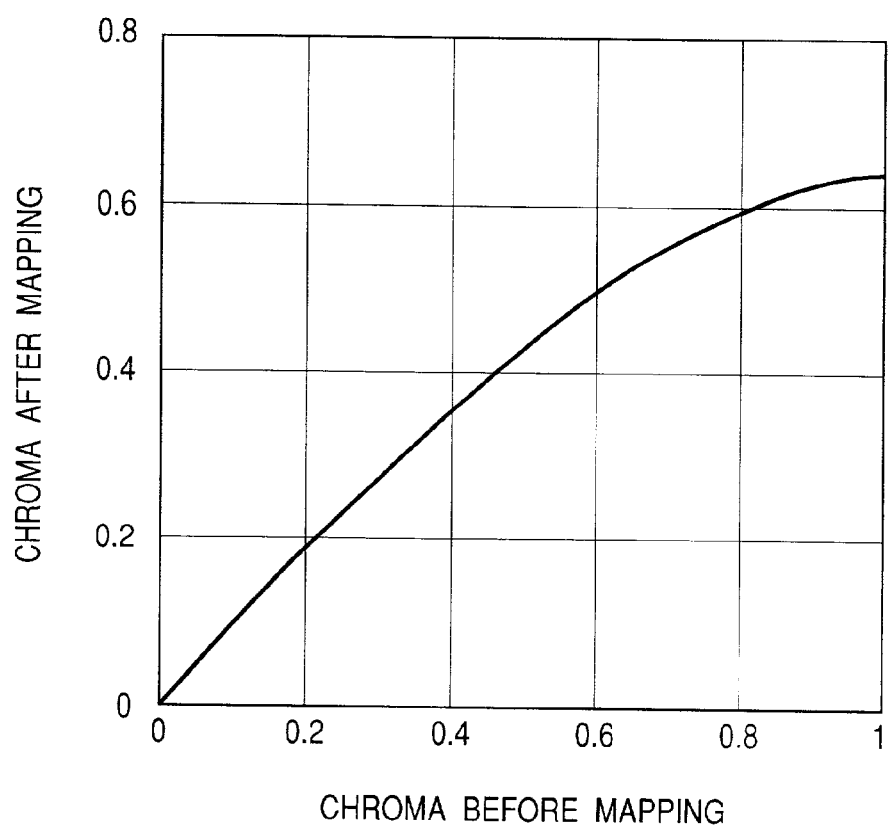
FIG. 8 is a diagram showing an example of a chroma input/output function for achieving nonlinear mapping of a chroma component.

The chroma input/output function g(•) can be shown as a schematic diagram in FIG. 8. Specifically, as the chroma becomes lower, the chroma is preserved more. Further, as the chroma becomes higher, the chroma is compressed at a higher compression ratio. Further, since the input/output function is at least the C1 continuousness, the change rate of the chroma smoothly varies, whereby pseudo-contours and the like are prevented from appearing.

By the lightness mapping operation in step 502 and the chroma mapping operation in step 503 as described above, the area surrounded by the monitor line is mapped into the area surrounded by the first intermediate mapped line. FIG. 10 shows the state of the mapping on the green face by way of example. In FIG. 10, the alternate short and long dashed line represents the monitor green line and the chroma-lightness loci belonging to the green face in the monitor color reproduction gamut, the solid line represents the first intermediate mapped green line and the mapping result of the chroma-lightness loci, and the dotted line represents the mapped green line.

Figure 11:
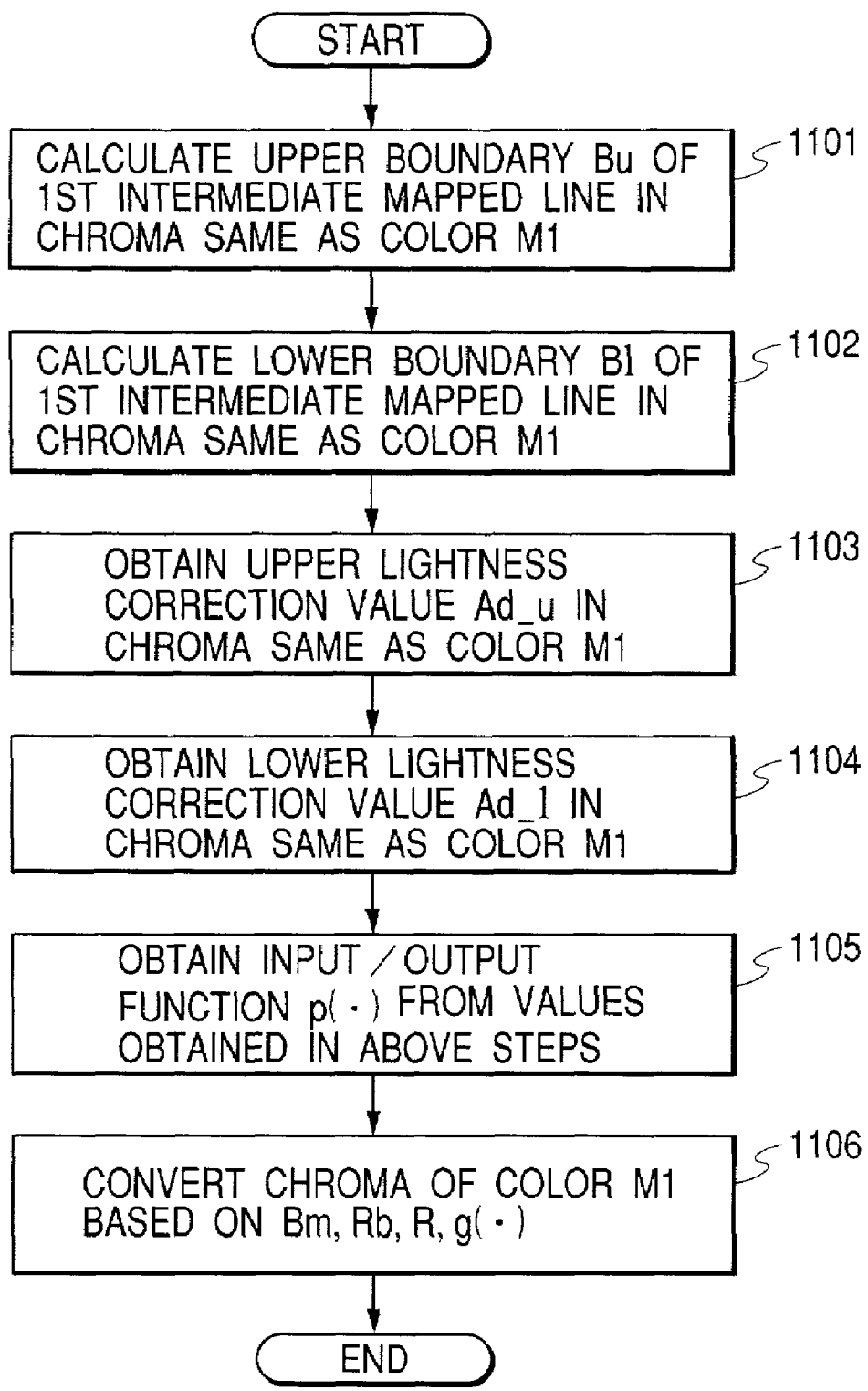
FIG. 11 is a flow chart showing a mapping operation in a step 504 of FIG. 5 in the second embodiment.

In the following, the lightness adjustment mapping operation in step 504 will be explained with reference to the flow chart shown in FIG. 11.

Figure 12:
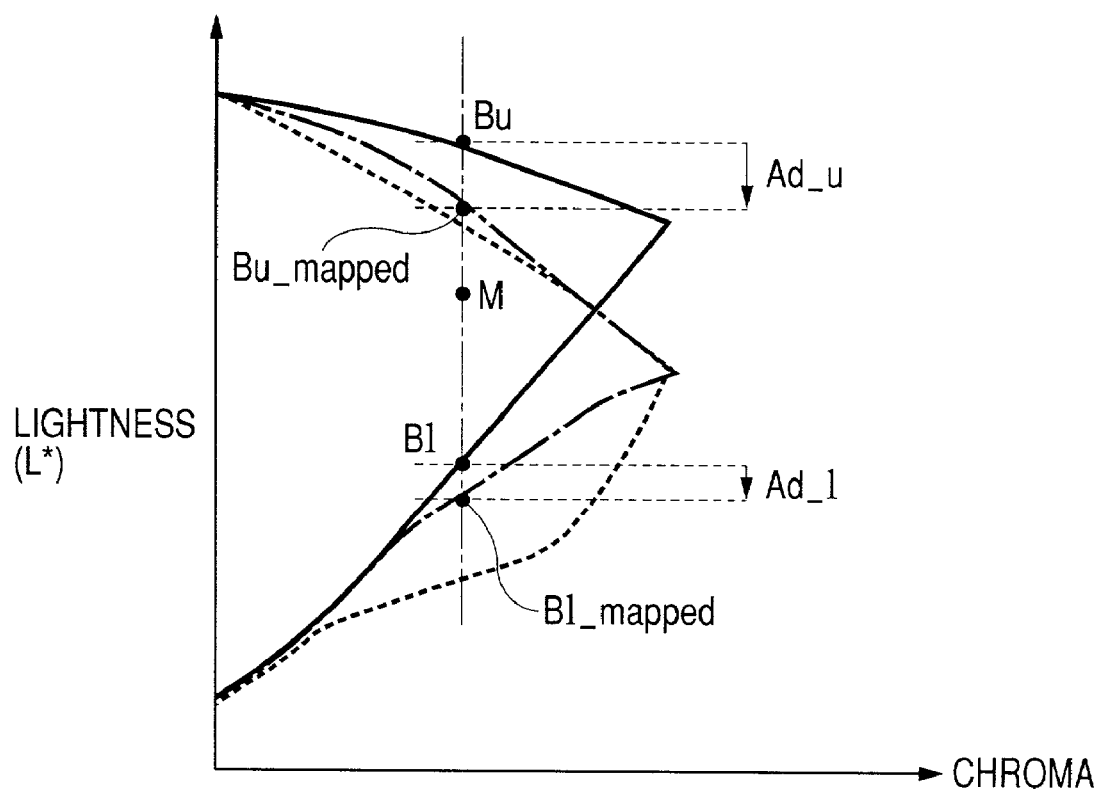
FIG. 12 is a schematic diagram showing spatial relations of respective lines used in steps 1101 to 1106.

In step 1101, an upper boundary Bu of the first intermediate mapped line in the chroma same as a color M1 is calculated. In step 1102, a lower boundary B1 of the first intermediate mapped line in the same chroma as the color M1 is calculated. FIG. 12 shows an example of the relation among the color M1, the upper boundary Bu and the lower boundary B1 on the green face. In FIG. 12, the solid line represents the first intermediate mapped green line, the alternate short and long dashed line represents the second intermediate mapped green line, and the dotted line represents the mapped green line.

In step 1103, an upper boundary $Bu_{\_mapped}$ of the second intermediate mapped line in the same chroma as the color M1 is calculated, and an upper lightness correction value Ad_u is obtained as Ad u=$Bu_{\_mapped}$−Bu. FIG. 12 schematically shows the relation between the upper lightness correction value Ad_u and the upper boundary Bu. In step 1104, a lower boundary $B1_{\_mapped}$ of the second intermediate mapped line in the chroma the same as in the color M1 is calculated, and a lower lightness correction value Ad_1 is obtained as Ad_1=$B1_{\_mapped}$−B1. FIG. 12 schematically shows the relation between the lower lightness correction value Ad_1 and the lower boundary B1.

In step 1105, an input/output function p(•) for mapping of lightness adjustment is given from the above four parameters. In a case of giving the input/output function p(•), it is required to satisfy the following conditions. Here, symbol $L_{Bl}$ denotes the lightness of lower boundary B1, symbol $L_{Blm}$ denotes the lightness of the lower boundary $Bl_{\_mapped}$, symbol $L_{Bu}$ denotes the lightness of the upper boundary Bu, and symbol $L_{Bum}$ denotes the lightness of the lower boundary $B1_{\_mapped}$.

The above necessary conditions are as follows. The support of p(•) is [$L_{Bl}$, $L_{Bu}$], p(•) increases monotonously on the support, $p(L_{Bl})=L_{Blm}$, $p(L_{Bu})=L_{Bum}$, $p(\bullet)$ is at least C1 continuousness, $p'(L_{Bl})=\alpha(\alpha>0$, $\alpha$ is a constant to control the compression, $\alpha$ is determined for each hue according to the lower lightness correction value Ad_1 ($\alpha\leq1$ if Ad_1 is positive, while $a\alpha\geq1$ if Ad_1 is negative)), and $p'(L_{Bu})=\beta$ ($\beta>0$, $\beta$ is a constant to control the compression, $\beta$ is determined for each hue according to the upper lightness correction value Ad_u ($\beta\geq1$ if Ad_u is positive, while P<1 if Ad_u is negative)).

Figure 13A:
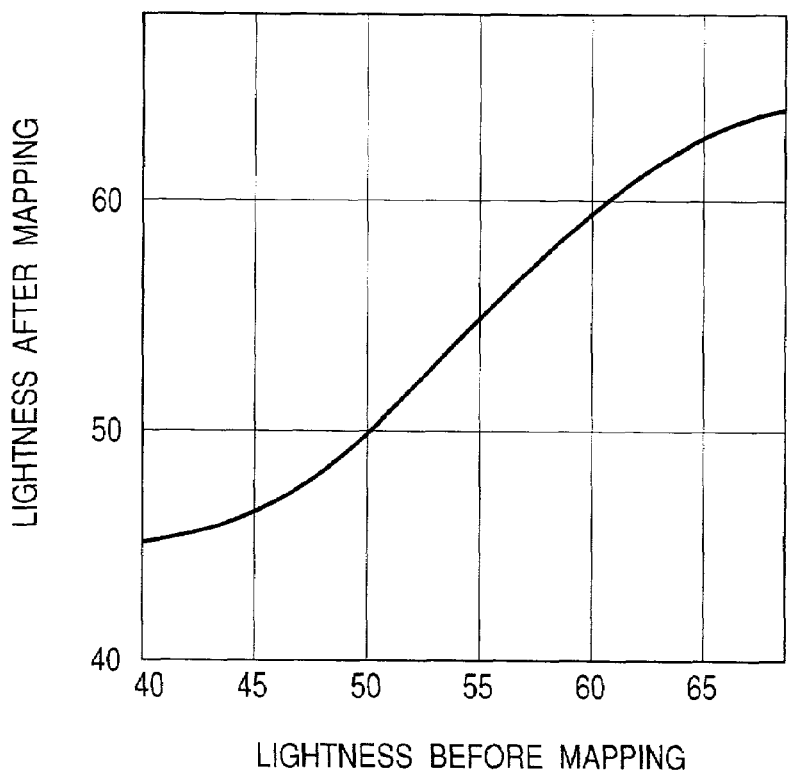
FIGS. 13A and 13B are diagrams showing an example of the lightness input/output function for achieving the nonlinear mapping of the lightness component.
Figure 13B:
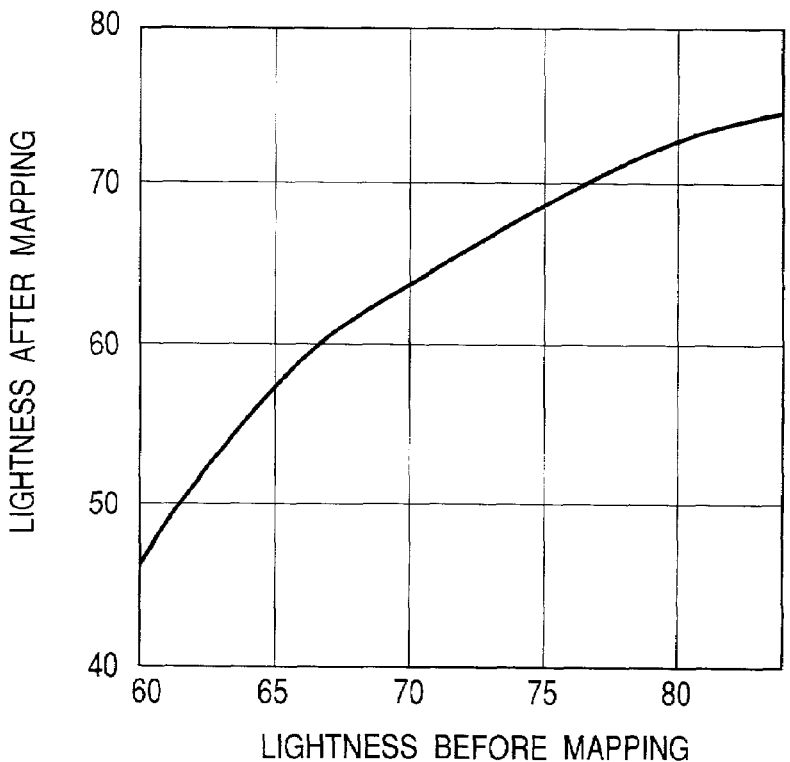

The input/output function $p(\bullet)$ is calculated so as to satisfy the above conditions. Further, in order to preserve the lightness at the intermediate part of the support as much as possible, the input/output function $p(\bullet)$ is calculated such that a lightness change quantity decreases as much as possible. Here, FIGS. 13A and 13B show an example of the input/output function $p(\bullet)$ in the present embodiment.

Finally, in step 1106, by using the input/output function $p(\bullet)$ obtained in the step 1105, lightness $Lm\_{mapped}$ after the mapping of the color M1 is obtained with respect to lightness Lm before the mapping, as $Lm\_{mapped}=p(Lm)$. Thus, the mapping to adjust the lightness is performed.

By the lightness adjustment mapping operation in step 504, the area surrounded by the first intermediate mapped line is mapped into the area surrounded by the second intermediate mapped line. FIG. 14 shows an example of the mapping on the green face. In FIG. 14, the alternate short and long dashed line represents the first intermediate mapped green line and the mapping result of the chroma-lightness loci explained in the step 502, the solid line represents the second intermediate mapped green line and the result obtained by the lightness mapping to the mapping result of the chroma-lightness loci, and the dotted line represents the mapped green line.

Figure 15:
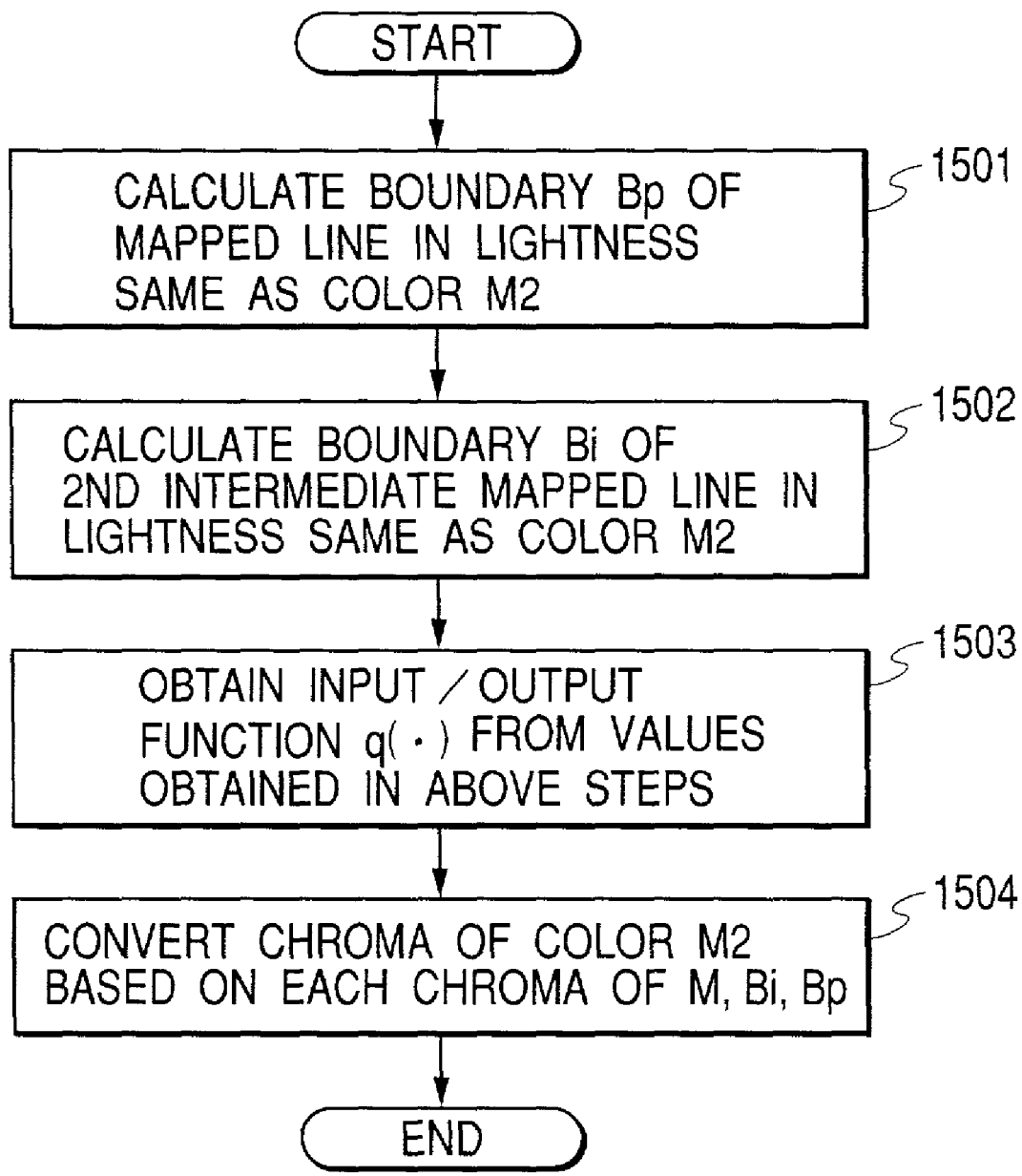
FIG. 15 is a flow chart showing the mapping operation in the step 504 of FIG. 5 in the second embodiment.

In the following, the chroma mapping operation in step 505 will be explained in detail with reference to the flow chart shown in FIG. 15.

Figure 16:
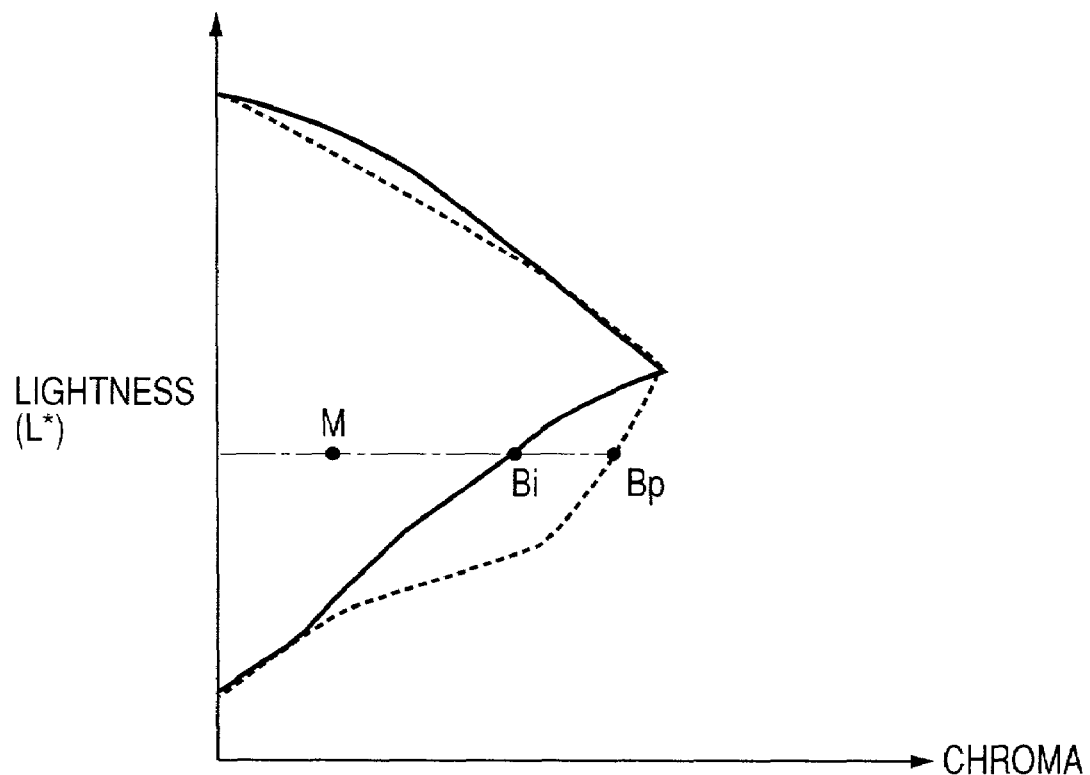
FIG. 16 is a schematic diagram showing spatial relations of respective colors obtained in steps 1501 to 1504.

In step 1501, in the hue of a color M2 being the mapping target, a boundary (color) Bp of the mapped line in the same lightness as the color M2 is calculated. In step 1502, a boundary (color) Bi of the second intermediate mapped line in the same lightness as the color M2 is calculated. FIG. 16 schematically shows the relation among the color M2, the color Bp and the color Bi on the green face. In FIG. 16, the solid line represents the second intermediate mapped green line, and the dotted line represents the mapped green line.

In step 1503, an input/output function $q(\bullet)$ for mapping of color gamut correction is given from the color Bp and the color Bi calculated in the above steps. Here, in a case where symbol $c_p$ denotes chroma of the color Bp and symbol $c_i$ denotes chroma of the color Bi, the input/output function $q(\bullet)$ is required to satisfy following conditions.

Figure 17A:
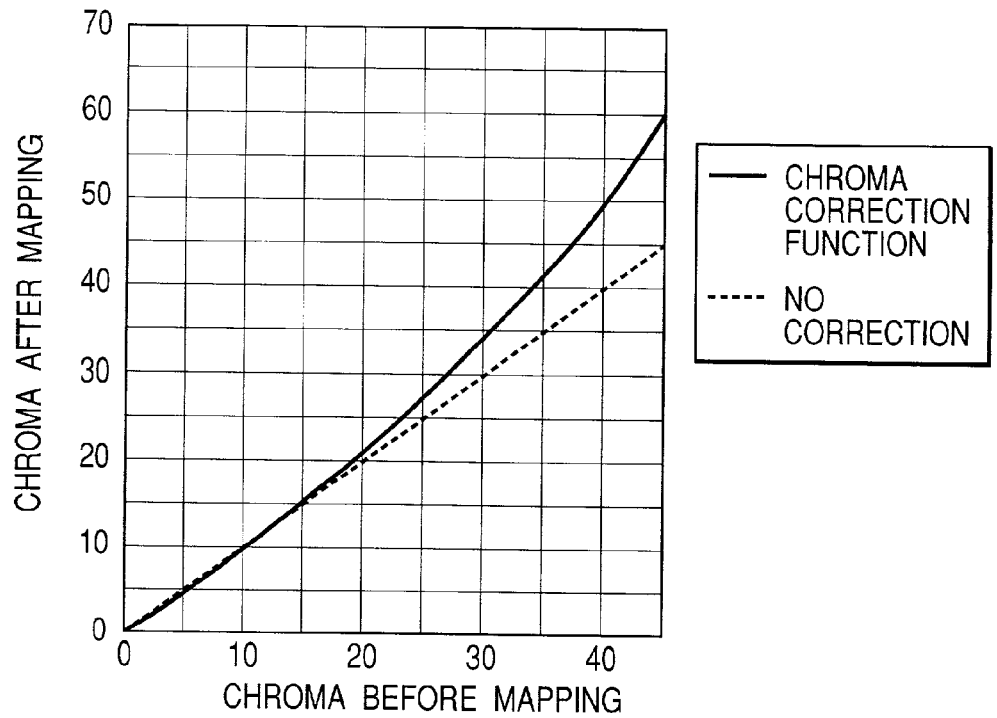
FIGS. 17A and 17B are diagrams showing an example of the chroma input/output function for achieving the nonlinear mapping of the chroma component.
Figure 17B:
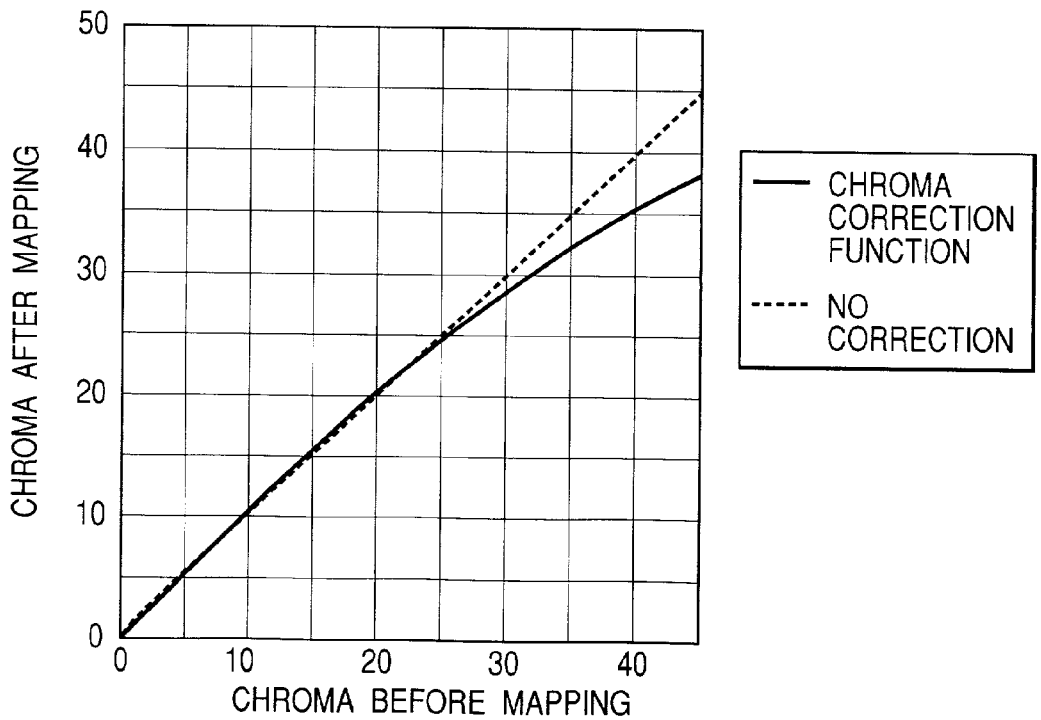

That is, the support of $q(\bullet)$ is [0, $c_i$], $q(0)=0$, $q(c_i)=c_p$, $q'(0)=1$, $q'(c_i)=\gamma$ ($\gamma>0$), and $q'(x)\neq0$ ($0\leq x\leq c_i$). The symbol $\gamma$ is the value to control enlargement ratio/compression ratio of the chroma correction in the vicinity of the maximum chroma, and this value is automatically determined. However, in the case where $c_i>c_p$, $\gamma<1$ is given, and the mapping by the input/output function $q(\bullet)$ is the compression operation. On the other hand, in a case where $c_i$, $c_p$, $\gamma$. 1 is given, and the mapping by the input/output function $q(\bullet)$ is the expansion (or decompression) operation. FIG. 17A shows an example of the input/output function $q(\bullet)$ in the case where $c_i$. $c_p$ (i.e., the expansion operation), and FIG. 17B shows an example of the input/output function $q(\bullet)$ in the case where $c_i>c_p$ (i.e., the compression operation).

In step 1504, the chroma of the color M2 is converted by using the input/output function $q(\bullet)$ obtained in the step 1503. If symbol $c_{org}$ denotes chroma of the color M2 and symbol $c_{mod}$ denotes chroma of the color M2 after the conversion, $c_{mod}=q(c_{org})$ is given.

By the chroma mapping operation in step 504, the area surrounded by the second intermediate mapped line is mapped into the area surrounded by the mapped line. FIG. 18 shows an example of the mapping on the green face. In FIG. 18, the alternate short and long dashed line represents the second intermediate mapped green line and the lightness mapping result of the chroma-lightness loci explained in step 503, and the solid line represents the mapped green line and the result obtained by the chroma mapping to the lightness mapping result of the chroma-lightness loci.

Finally, in step 506, the hue is appropriately adjusted on the basis of the information obtained by the mapping parameter calculation device 206.

As above, the mapping of the internal sample points in step 303 was described in detail. In step 303 of the present embodiment, explanation has been given in terms of the algorithm premised on the mapping that was originally to be performed on a three-dimensional space, having been reduced to a mapping on a two-dimensional space. However, it is of course possible to perform the mapping on the three-dimensional space as it is.

In the following, an example of the method to define the surface gradation line in step 304 will be described with reference to FIG. 19.

Figure 19:
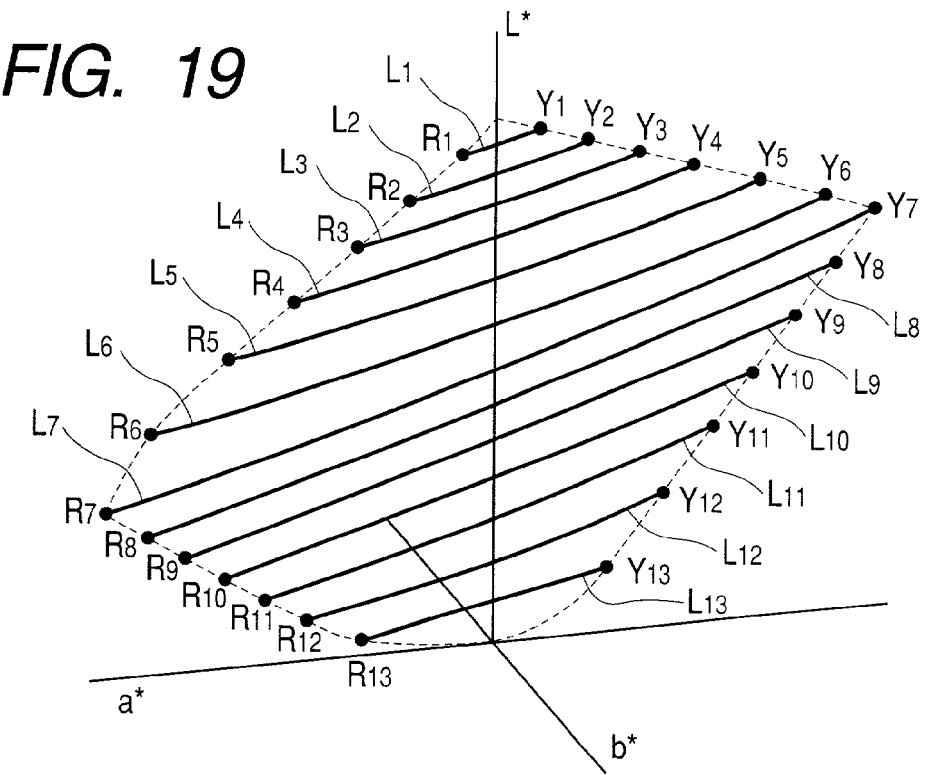
FIG. 19 is a schematic diagram showing surface gradation lines before the mapping.
Figure 22:
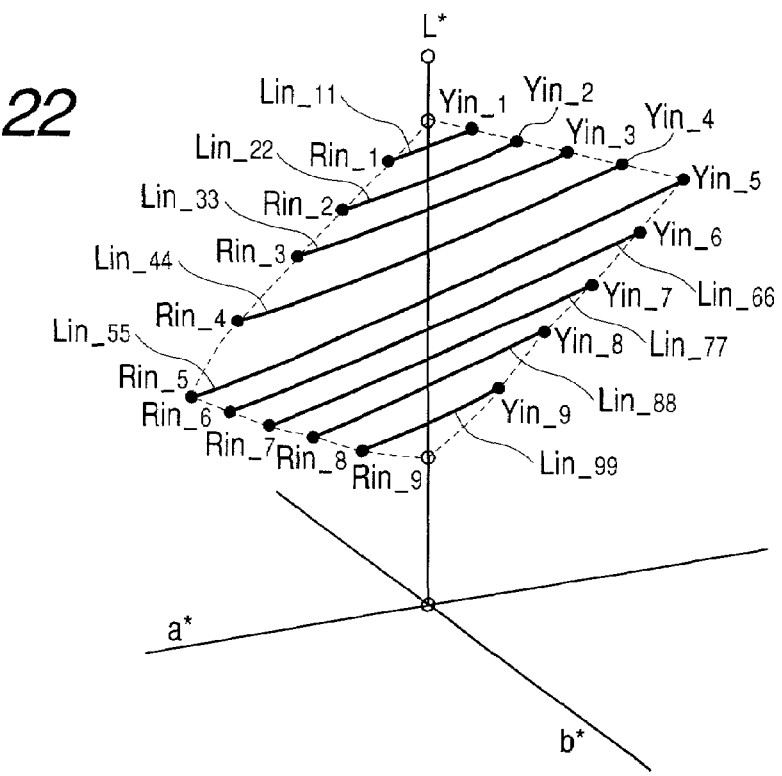
FIG. 22 is a schematic diagram showing the internal gradation lines after the mapping.

FIG. 19 shows a state where the surface gradation lines are defined in a case where the number of surface sample points belonging to each face is the identical. Here, a gradation line Li in FIG. 22 represents the surface gradation line connecting the surface sample point on the red face and the surface sample point on the yellow face with each other. Symbol Ri denotes a surface sample point on the red face, and an index i is given to this surface sample point in the order of higher lightness. Symbol Yi denotes a surface sample point on the yellow face, and an index i is given to this surface sample point in the order of higher lightness. As is apparent from the drawings, in the present embodiment, sample points having the identical index number are connected to define the surface gradation line. Further, the surface gradation line has following R, G and B values:

$R=(1-t)Rri+tRyi$ $G=(1-t)Gri+tGyi$ $B=(1-t)Bri+tByi$

Here, symbols R, G and B respectively denote the R, G and B values of the surface gradation line, symbols Rri, Gri and Bri respectively denote the R, G and B values of the sample point Ri, symbols Ryi, Gyi and Byi respectively denote the R, G and B values of the sample point Yi, and $0\leq t\leq1$.

That is, the surface gradation line is obtained by representing in the L*a*b* color space the line connecting the surface sample points on the RGB color space.

However, in addition to the above expression of the present embodiment, the surface gradation line can be represented in various definition methods. Thus, inconvenience does not arise even if a definition method different from that shown in the present embodiment is used, or if the number of surface sample points belonging to each face is not identical.

Figure 20:
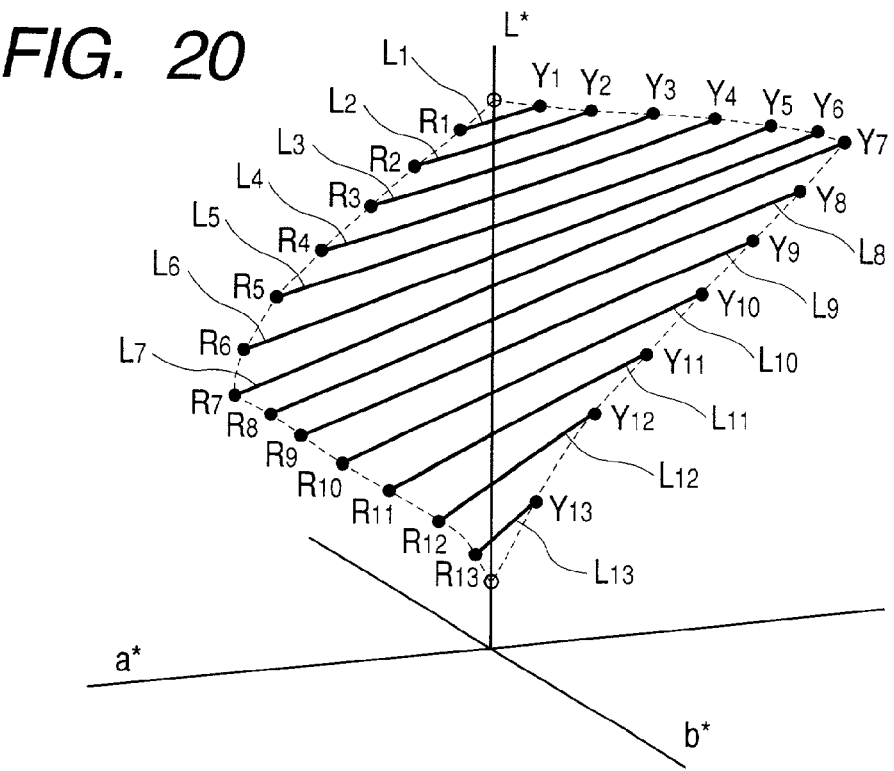
FIG. 20 is a schematic diagram showing the surface gradation lines after the mapping.

In the mapping of the surface gradation line in step 305, the surface gradation line of FIG. 19 is, e.g., shown in FIG. 20. Further, as described also in the first embodiment, it should be noted that the mapping result of the surface gradation line is not necessarily located on the surface of the printer color reproduction gamut.

In the following, an example of the method to define the internal gradation line in step 306 will be described with reference to FIG. 21.

Figure 21:
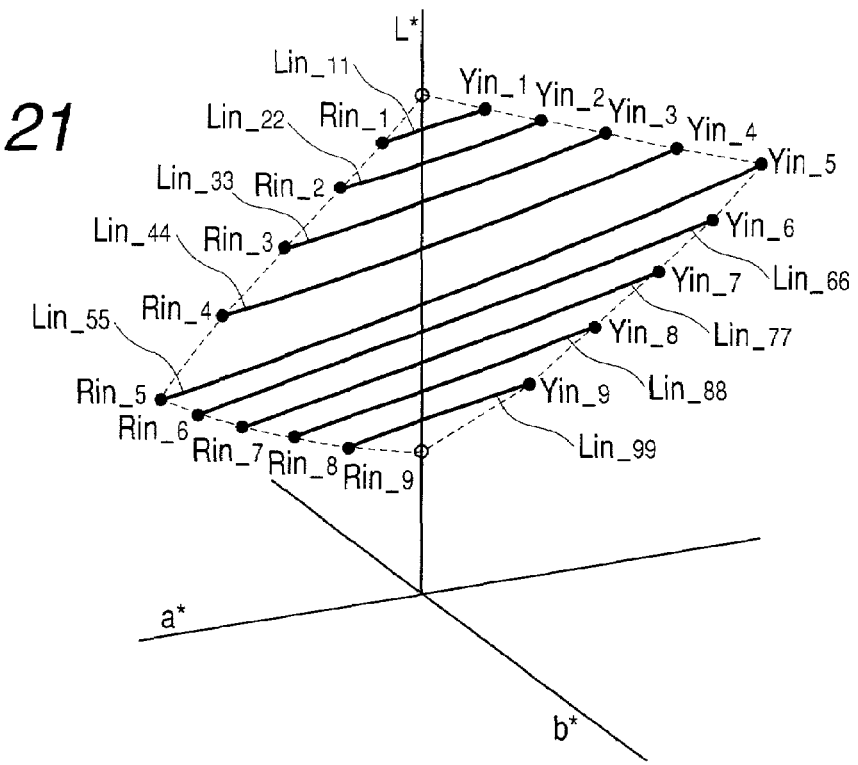
FIG. 21 is a schematic diagram showing internal gradation lines before the mapping.

FIG. 21, a gradation line Lin_ij represents the internal gradation line connecting an internal sample point Rin_i on the red face and an internal sample point Yin_j on the yellow face with each other. Here, the internal gradation line has following R, G and B values:

$$R=(1-t)Rri+tRyj$$

$$G=(1-t)Gri+tGyj$$

$$B=(1-t)Bri+tByj$$

Here, symbols R, G and B respectively denote the R, G and B values of the internal gradation line, symbols Rri, Gri and Bri respectively denote the R, G and B values of the sample point Rin_i, symbols Ryj, Gyj and Byj respectively denote the R, G and B values of the sample point Yin_j, and $0 \leq t \leq 1$.

That is, as well as the surface gradation line, the internal gradation line is obtained by representing in the L*a*b* color space the line connecting the surface sample points on the RGB color space.

Although the mapping of the internal gradation line in step 307 is influenced by either or both the surface gradation line and the adjacent internal gradation line, such influence is eased in proportion to the distance between the influenced surface gradation line and the influenced internal gradation line. For example, the internal gradation lines shown in FIG. 21 are mapped as shown in FIG. 22.

Figure 23:
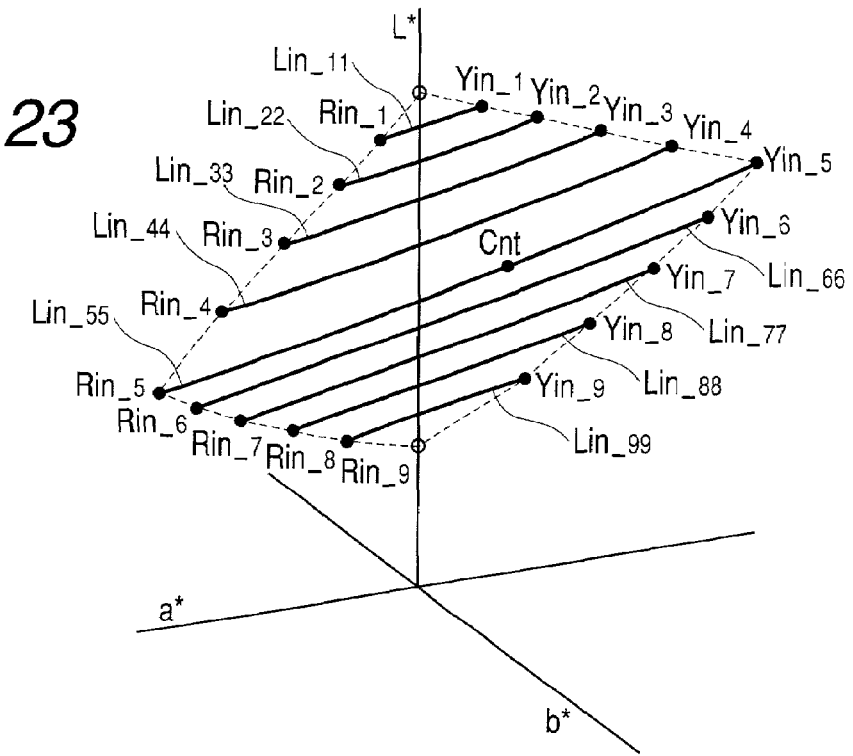
FIG. 23 is a schematic diagram showing the internal gradation lines before the mapping.
Figure 24:
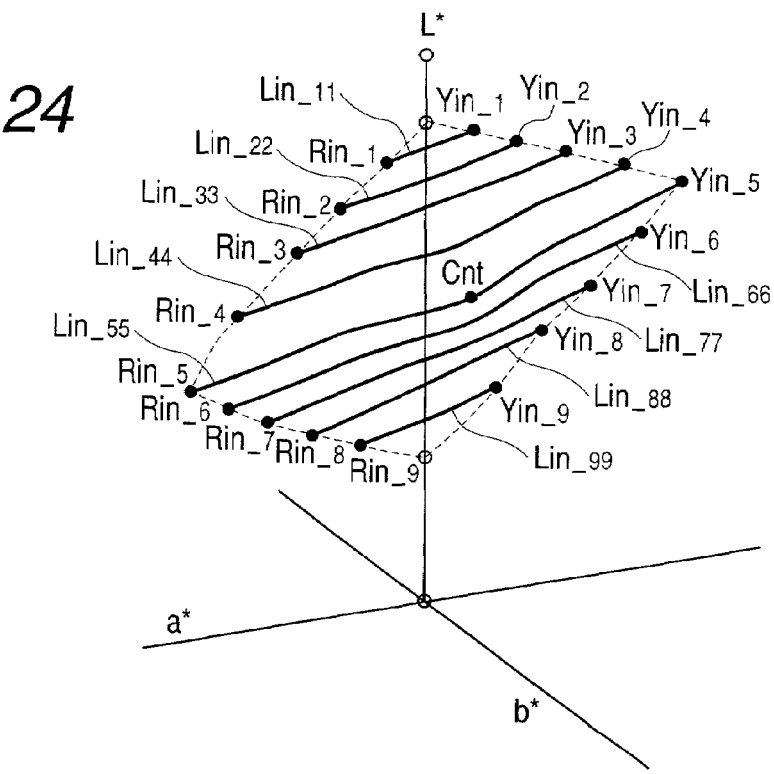
FIG. 24 is a schematic diagram showing the internal gradation lines after the mapping.

FIGS. 23 and 24 show an example of gradation line control based on a control point. Concretely, FIG. 23 shows that a control point Cnt is determined on the gradation line Lin_55, and FIG. 24 shows the coordinates at which the control point Cnt of FIG. 23 is mapped. Thus, the mapping of the internal gradation line Lin_55 varies according to the mapping of the control point Cnt. Also, the adjacent internal gradation line varies due to influence of the mapping variation of the internal gradation line Lin_55, but such the influence is eased in proportion to the distance from the internal gradation line Lin_55. In the present embodiment, the internal gradation line is controlled to be passed through the control point, but the internal gradation line is not necessarily passed through the control point in such as case as the B-spline curve is used.

As in the first embodiment, it should be noted that the mapping is controlled such that the mapping result of the surface sample points is sure to be located inside the printer color reproduction gamut.

As described above, according to the present embodiment, since the gamut mapping is controlled on the basis of the six hues of primary colors, it is possible to perform intuitive control.

Further, according to the present embodiment, since the prior art is applied to the mapping of the six hue faces, it is possible to use conventional know-how and also take adjustment with the conventional gamut mapping.

Third Embodiment

In the third embodiment, how to take the surface sample points and the internal sample points in the second embodiment is devised, and also how to take the surface gradation line and the internal gradation line in the second embodiment is devised, whereby the labor in the color design is further reduced, and the control is made easier to grasp intuitively.

It should be noted that the third embodiment is obtained by modifying the surface sample points and the internal sample points in the operation algorithm of the color gamut mapping device 207 in the second embodiment. For this reason, the parts overlapping with the parts in the second embodiment are omitted, and only the different parts will be described.

In the following, how to determined the sample point in step 301 of the flow chart shown in FIG. 3 will be described in detail.

In the present embodiment, how to determine the surface and internal sample points distributed on the six faces, i.e., red, green, blue, cyan, magenta and yellow faces, will be explained. Incidentally, of course, there is no problem even if a sample point which is not distributed on any of the above six faces (i.e., not satisfying any of conditions A1 to A12 and B1 to B6 in the second embodiment and later-described conditions) exists.

In the present embodiment, the sample point is determined not in the L*a*b* color space but in the RGB color space. Here, as to R, G and B values capable of being taken at the sample point, it is defined to determine the R, G and B values in the same discrete step. That is, as each of the R, G and B values, it is defined to take any of discrete values shown in FIG. 25. Further, the surface sample point satisfies any of the 12 conditions A1 to A12, and the internal sample point satisfies any of the six conditions B1 to B6.

Figures 25, 26:
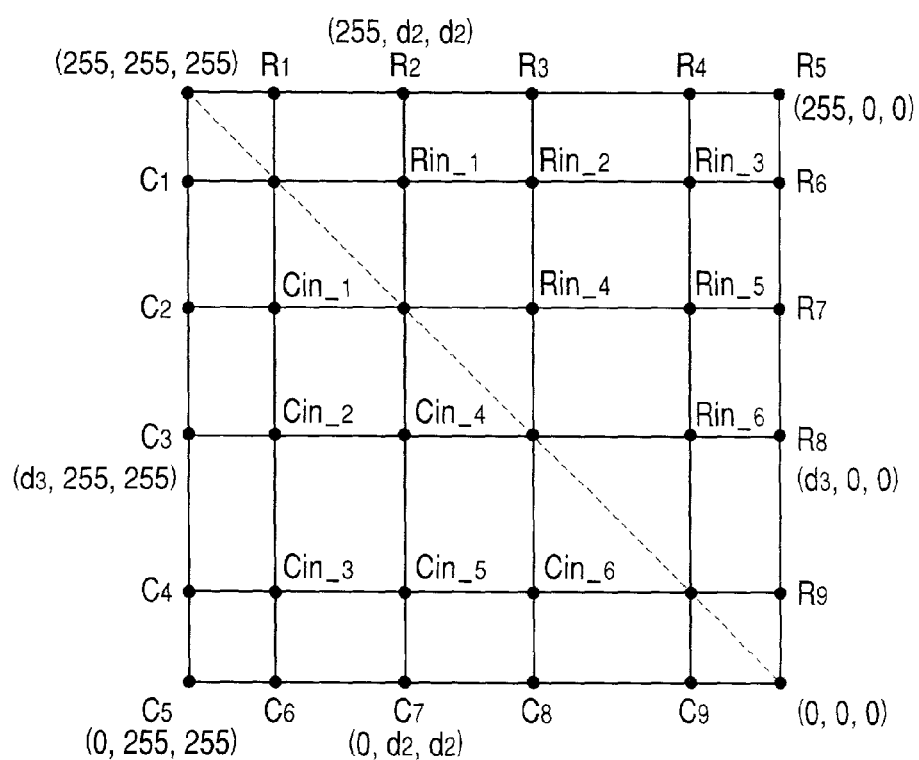
FIG. 25 is a table showing values capable of being taken as R, G and B values.
FIG. 26 is a schematic diagram showing distribution of surface sample points and internal sample points on a sectional plane in an RGB color space.
Figure 27:
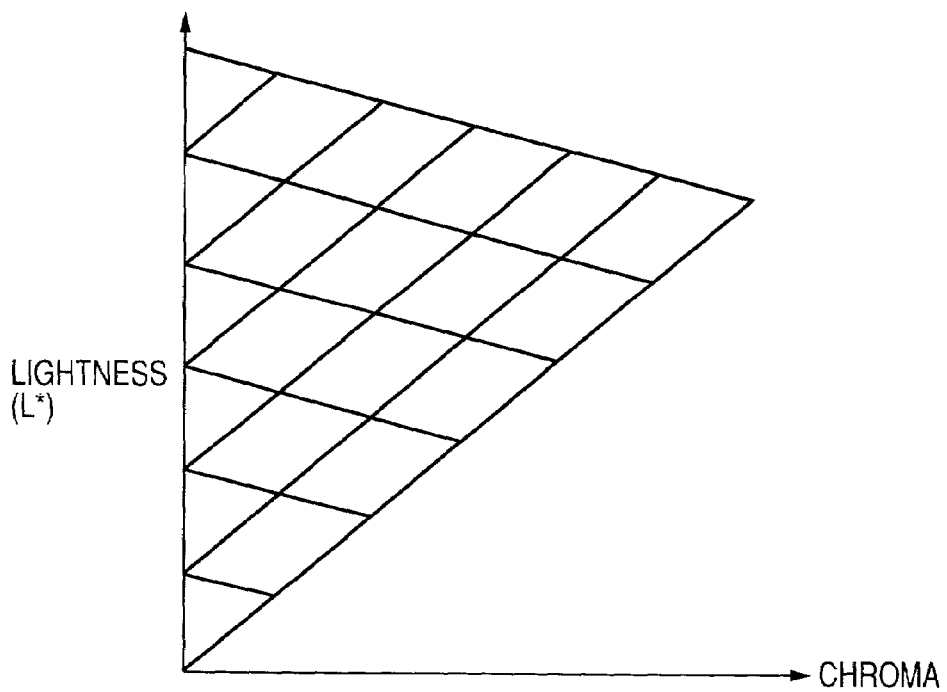
FIG. 27 is a schematic diagram showing a monitor color reproduction gamut in a green hue.
Figure 28:
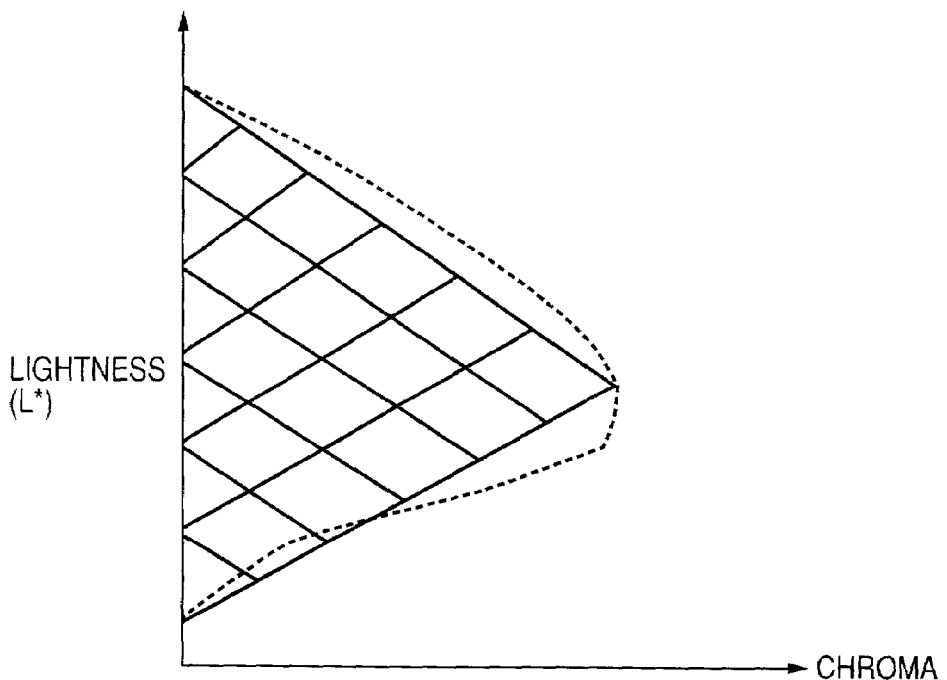
FIG. 28 is a schematic diagram showing an example of gamut mapping.
Figure 29:
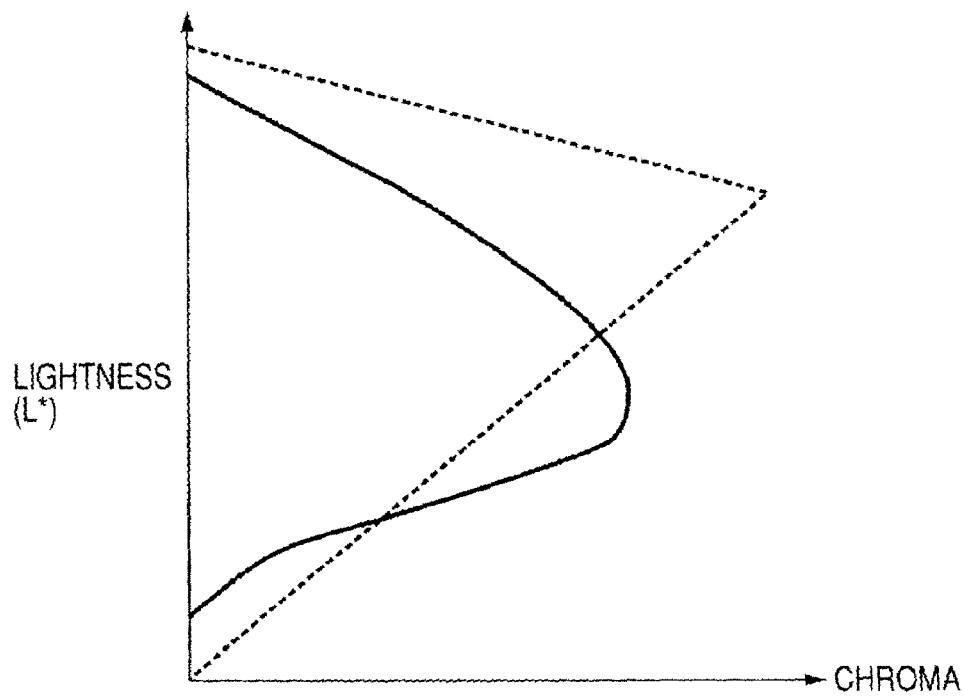
FIG. 29 is a schematic diagram showing a monitor color reproduction gamut and a printer color reproduction gamut in the green hue.
Figure 30:
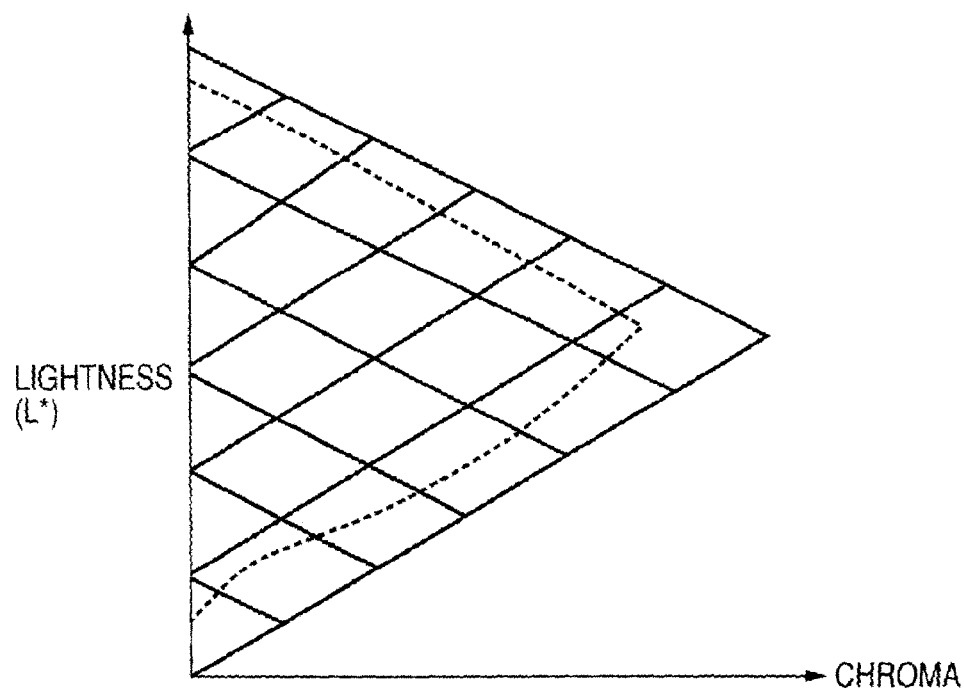
FIG. 30 is a schematic diagram showing a monitor color reproduction gamut and a printer color reproduction gamut in the red hue.
Figure 31A:
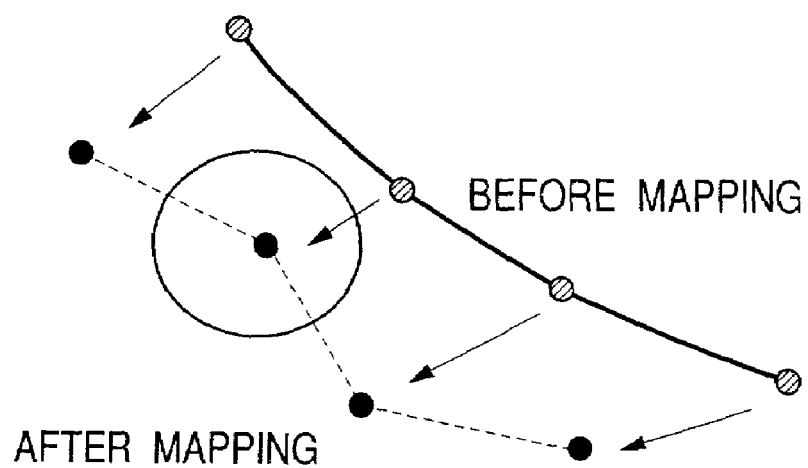
FIGS. 31A and 31B are schematic diagrams for explaining gradation.
Figure 31B:
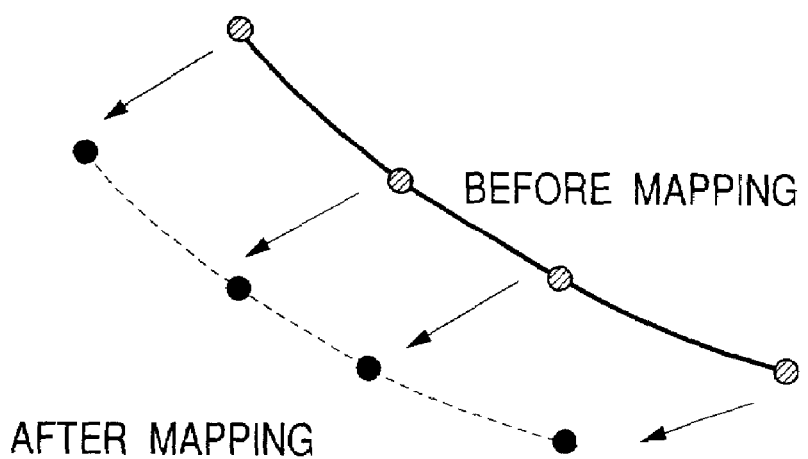

FIG. 26 shows the distributions of the surface sample points and the internal sample points on the RGB color space, by using the red face and the cyan face as examples. Concretely, FIG. 26 shows the sectional plane which is obtained by sectioning the color reproduction gamut on the RGB color space through three (white, red and black) points. In FIG. 26, the upper left point (255, 255,255) represents white, and lower right point (0,0,0) represents black. The dotted line represents a gray axis which varies from the white point (255,255,255) to the black point (0,0,0) on the (R, G, B) coordinates. Symbol Ri denotes a surface sample point on the red face, symbol Ci denotes a surface sample point on the cyan face, and an index i is given to such the surface sample point in the order of higher lightness. Further, symbol Rin_i denotes an internal sample point on the red face, and symbol Cin_j denotes an internal sample point on the cyan face.

The index number rule in the internal sample points is as follows. First, with respect to the internal sample points having the maximum hue component on the hue face in question, the index numbers are sequentially given to these points in the order of higher lightness sample points. That is, on the red face, in the internal sample points of which the red components are given as $d_1$, the index numbers are sequentially given to these points in the order of higher lightness sample points. Further, on the cyan face, in the internal sample points of which the green components and the blue components are given as $d_1$, the index numbers are sequentially given to these points in the order of higher lightness sample points.

Subsequently, with respect to the internal sample points having the large hue components, the index numbers are sequentially given to these points in the order of higher lightness sample points. That is, on the red face, in the internal sample points of which the red components are given as $d_2$, the index numbers are sequentially given to these points in the order of higher lightness sample points. Further, on the cyan face, in the internal sample points of which the green components and the blue components are given as $d_2$, the index numbers are sequentially given to these points in the order of higher lightness sample points. After then, the index numbers are given to all the internal sample points in the same manner as above, whereby the distributions as shown in FIG. 26 can be obtained. Also, on the green, blue, magenta and yellow faces, the index numbers are given to the internal sample points in the same manner as above.

In the following, the method to define the surface gradation line in step 304 will be explained.

In the present embodiment, the surface gradation line is defined by connecting, with a line on the RGB color space, the surface sample points of which the index numbers are the identical respectively on the adjacent hue faces. For example, the surface gradation line between the red face and the yellow face has the following R, G and B values:

$R=(1-t)Rri+tRyi$ $G=(1-t)Gri+tGyi$ $B=(1-t)Bri+tByi$

Here, symbols R, G and B respectively denote the R, G and B values of the surface gradation line, symbols Rri, Gri and Bri respectively denote the R, G and B values of the sample point Ri, symbols Ryi, Gyi and Byi respectively denote the R, G and B values of the sample point Yi, and $0 \leq t \leq 1$.

In the following, the method to define the internal gradation line in step 306 will be explained.

In the present embodiment, the internal gradation line is defined by connecting, with a line on the RGB color space, the internal sample points of which the index numbers are the identical respectively on the adjacent hue faces. For example, the internal gradation line between the red face and the yellow face has the following R, G and B values:

$R=(1-t)Rri+tRyi$ $G=(1-t)Gri+tGyi$ $B=(1-t)Bri+tByi$

Here, symbols R, G and B respectively denote the R, G and B values of the internal gradation line, symbols Rri, Gri and Bri respectively denote the R, G and B values of the sample point Rin_i, symbols Ryi, Gyi and Byi respectively denote the R, G and B values of the sample point Yin i, and $0 \leq t \leq 1$.

According to the present embodiment, since how to take the sample points and the gradation lines are devised, the mapping control is made still easier to grasp intuitively.

OTHER EMBODIMENTS

The present invention also includes a case of supplying a program code of software for achieving the functions of the above embodiments to a computer (CPU or MPU) in an apparatus or a system connected to various devices to operate these devices to achieve the functions of the above embodiments, and causing the computer in the apparatus or the system to operate these devices according to the supplied program codes.

In this case, the program code of software achieves the functions of the above embodiments, whereby the program code itself and a means such as a storage medium for storing the program code constitute the present invention.

As the storage medium for storing the program code, e.g., a floppy disk, a hard disk, an optical disk, a magneto-optical disk, a CD-ROM, a magnetic tape, a non-volatile memory card, a ROM or the like can be used.

It is needless to say that the program code is included in the embodiments of the present invention not only in the case where the functions of the above embodiments are achieved by executing the supplied program code with the computer, but also in a case where the program code cooperates with an OS (operating system) running on the computer or other application software to achieve the functions of the above embodiments.

Further, it is needless to say that the present invention includes a case where the supplied program code is stored in a memory provided in a function expansion board inserted in the computer or a function expansion unit connected to the computer, thereafter, on the basis of an instruction of the program code, a CPU or the like provided in the function expansion board or the function expansion unit executes a part or all of actual processes, and thus the functions of the above embodiments are achieved by such the processes.

The present invention can be modified in various manner within the scope of the following claims.

What is claimed is:

1. An image processing method which maps a first color gamut into a second color gamut, comprising the steps of:
   setting first sample points on a surface of the first color gamut, and second sample points in the first color gamut;
   obtaining third sample points by mapping the first sample points into the second color gamut, and obtaining fourth sample points by mapping the second sample points into the second color gamut;
   setting a plurality of independent surface gradation lines based on the first sample points and a plurality of independent internal gradation lines based on the second sample points, one of the surface gradation lines being defined by a function indicating a continuous locus linking the plurality of sample points in the first sample points, and one of the internal gradation lines being defined by a function indicating a continuous locus linking the plurality of sample points in the second sample points;
   mapping the plurality of independent surface gradation lines based on the third sample points, and mapping the plurality of independent internal gradation lines based on the fourth sample points;
   calculating a relative position of an input color to the surface gradation lines or the internal gradation lines; and
   calculating an output color from the plurality of independent mapped surface gradation lines or the plurality of independent mapped internal gradation lines, based on the relative position,
   wherein the surface gradation lines and the internal gradation lines each indicate a locus of color change in the first color gamut, and the plurality of independent mapped surface gradation lines and the plurality of independent mapped internal gradation lines each indicate a locus of color change in the second color gamut.

2. A method according to claim 1, wherein the surface, internal, mapped surface and mapped internal gradation lines are obtained by using at least one of a B-spline curve, a rational B-spline curve, a Bézier curve, and a one- or more-dimensional spline curve.

3. A method according to claim 1, wherein the first sample points are located on six faces of an R (red) face, a G (green) face, a B (blue) face, a C (cyan) face, an M (magenta) face and a Y (yellow) face in the first color gamut.

4. A method according to claim 1, wherein the mapping of the surface and internal gradation lines to the second color gamut includes two-dimensional mapping on a lightness-chroma plane according to the first color gamut and the second color gamut, and adjustment of a hue component.

5. An image processing method according to claim 1, wherein the relative position is defined by a ratio of internal division.

6. An image processing method according to claim 1, wherein the relative position is defined by an angle ratio.

7. An image processing apparatus which maps a first color gamut into a second color gamut, comprising:
- a first sample point setting unit adapted to set first sample points on a surface of the first color gamut and second sample points in the first color gamut;
- an obtaining unit adapted to obtain third sample points by mapping the first sample points into the second color gamut, and obtaining fourth sample points by mapping the second sample points into the second color gamut;
- a gradation line setting unit adapted to set a plurality of independent surface gradation lines based on the first sample points and a plurality of independent internal gradation lines based on the second sample points, one of the surface gradation lines being defined by a function indicating a continuous locus linking the plurality of sample points in the first sample points, and one of the internal gradation lines being defined by a function indicating a continuous locus linking the plurality of sample points in the second sample points;
- a gradation line mapping unit adapted to map the plurality of independent surface gradation lines based on the third sample points, and mapping the plurality of independent internal gradation lines based on the fourth sample points;
- a calculating unit, for calculating a relative position of an input color to the surface gradation lines or the internal gradation lines; and
- a calculating unit, for calculating an output color from the plurality of independent mapped surface gradation lines or the plurality of independent mapped internal gradation lines, based on the relative position,
- wherein the surface gradation lines and the internal gradation lines each indicate a locus of color change in the first color gamut, and the plurality of independent mapped surface gradation lines and the plurality of independent mapped internal gradation lines each indicate a locus of color change in the second color gamut.

8. A computer-readable storage medium which computer-readably stores a program to cause a computer to execute an image processing method which maps a first color gamut into a second color gamut, said method comprising the steps of:
- setting first sample points on a surface of the first color gamut, and second sample points in the first color gamut;
- obtaining third sample points by mapping the first sample points into the second color gamut, and obtaining fourth sample points by mapping the second sample points into the second color gamut;
- setting a plurality of independent surface gradation lines based on the first sample points and a plurality of independent internal gradation lines based on the second sample points, one of the surface gradation lines being defined by a function indicating a continuous locus linking the plurality of sample points in the first sample points, and one of the internal gradation lines being defined by a function indicating a continuous locus linking the plurality of sample points in the second sample points;
- mapping the plurality of independent surface gradation lines based on the third sample points, and mapping the plurality of independent internal gradation lines based on the fourth sample points;
- calculating a relative position of an input color to the surface gradation lines or the internal gradation lines; and
- calculating an output color from the plurality of independent mapped surface gradation lines or the plurality of independent mapped internal gradation lines, based on the relative position,
- wherein the surface gradation lines and the internal gradation lines each indicate a locus of color change in the first color gamut, and the plurality of independent mapped surface gradation lines and the plurality of independent mapped internal gradation lines each indicate a locus of color change in the second color gamut. aa 9. An image processing method which maps a first color gamut into a second color gamut, the first color gamut having a surface and having an interior contained entirely within the surface, and the second color gamut having a surface and having an interior contained entirely within the surface of the second color gamut, said method comprising the steps of:
- setting a set consisting of a first predetermined number of first sample points on the surface of the first color gamut, and a set consisting of a second predetermined number of second sample points in the interior of the first color gamut, where the second predetermined number may be either equal to or different from the first predetermined number;
- obtaining third sample points corresponding to respective ones of the first sample points, and fourth sample points corresponding to respective ones of the second sample points, wherein the third sample points and the fourth sample points are in the second color gamut, and the fourth sample points are in the interior of the second color gamut;
- setting a plurality of independent first surface gradation lines based on the first sample points and a plurality of independent first internal gradation lines based on the second sample points, the plurality of independent first surface gradation lines each lying entirely on the surface of the first color gamut and the plurality of independent first internal gradation lines each containing points in the interior of the first color gamut, wherein the plurality of independent first surface gradation lines and the plurality of independent first internal gradation lines each indicate a respective locus of color change in the first color gamut, one of the surface gradation lines being defined by a function indicating a continuous locus linking the plurality of sample points in the first sample points, and one of the internal gradation lines being defined by a function indicating a continuous locus linking the plurality of sample points in the second sample points;
- mapping the plurality of independent first surface gradation lines to a plurality of independent second surface gradation lines that are based on the third sample points, and mapping the plurality of independent first internal gradation lines to a plurality of independent second internal gradation lines that are based on the fourth sample points and that lie in the interior of the second color gamut, wherein the plurality of independent second surface gradation lines and the plurality of independent second internal gradation lines each indicate a respective locus of color change in the second color gamut; and
- mapping an input color into an output color in the second color gamut by using the plurality of independent second surface gradation lines and the plurality of independent second internal gradation lines,
- wherein said step of mapping the input color into the output color in the second gamut includes calculating the output color from the plurality of independent second surface gradation lines and the plurality of independent second internal gradation lines, based on the input color and its location in the first color gamut relative to at least one gradation line from among the plurality of independent first surface gradation lines and the plurality of independent first internal gradation lines.

* * * * *